United States Patent

Celis et al.

[11] Patent Number: 6,021,405
[45] Date of Patent: Feb. 1, 2000

[54] SYSTEM AND METHOD FOR OPTIMIZING DATABASE QUERIES WITH IMPROVED PERFORMANCE ENHANCEMENTS

[75] Inventors: Pedro Celis, Austin, Tex.; Diana Shak, San Jose, Calif.; Jay Vaishnav, Cupertino, Calif.; Hansjorg Zeller, Los Altos, Calif.

[73] Assignee: Tandem Computers, Inc., Cupertino, Calif.

[21] Appl. No.: 08/763,407

[22] Filed: Dec. 11, 1996

Related U.S. Application Data

[63] Continuation-in-part of application No. 08/702,106, Aug. 23, 1996, Pat. No. 5,822,747.

[51] Int. Cl.⁷ ..................................................... G06F 17/30
[52] U.S. Cl. .................................................................. 707/2
[58] Field of Search ................................... 707/1, 2, 3, 4, 707/5

[56] References Cited

U.S. PATENT DOCUMENTS

| | | | |
|---|---|---|---|
| 5,659,725 | 8/1997 | Levy et al. ................................... | 707/3 |
| 5,680,603 | 10/1997 | Bhargava et al. .......................... | 707/2 |
| 5,724,569 | 3/1998 | Andres ........................................ | 395/2 |

FOREIGN PATENT DOCUMENTS

0573252A2  12/1993  European Pat. Off. .

OTHER PUBLICATIONS

Kim, H., Lee S. "Tree Query Optimization in Distributed Object Oriented Databases", IEEE pp. 45–52, Apr. 1994.
Galindo–Legaria, "Algebraic Optimization of Outerjoin Queries", Ph.D. dissertation, Center for Research in Computing Technology, Harvard University, Cambrige, Ma, 1992.

*Primary Examiner*—Jack M. Choules
*Attorney, Agent, or Firm*—Pennie & Edmonds LLP

[57] ABSTRACT

A system and method for optimizing a database query with improved performance enhancements is herein disclosed. The database query consists of one or more logical expressions. Through the repeated application of one or more rules, the logical expressions are transformed into execution plans. The query optimizer partitions the database query into one or more subproblems with each subproblem consisting of one or more logical expressions. A plan is obtained for each subproblem with the plan for the database query including the plans for each subproblem. The query optimizer is cost-based and uses rules including transformation and implementation rules that are used to perform transformations on the logical expressions in a subproblem in order to produce a plan. The rules are classified into context-free and context-sensitive in order to avoid generating duplicate expressions. Context-free rules are applied once for each logical expression and context-sensitive rules are applied once for each logical expression for a particular optimization goal. In a preferred embodiment, the query optimizer performs several optimization passes over the database query in order to obtain an optimal plan. For each pass, if no optimal plan exists for the requested optimization goal, existing plans having the same optimization goal are utilized with each input reoptimized for a more cost effective plan.

19 Claims, 16 Drawing Sheets

LOGICAL EXPRESSION
304

PLAN
305

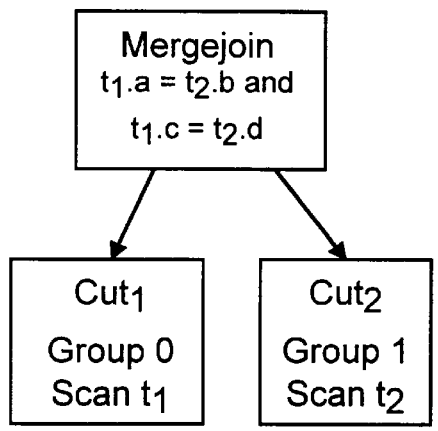
FIG. 14A
|      | Input₁ | Input₂ |
|------|--------|--------|
| rpp1 | a,c ascending | b,d ascending |
| rpp2 | a,c descending | b,d descending |
| rpp3 | c,a ascending | d,b ascending |
| rpp4 | c,a descending | d,b descending |
FIG. 14B
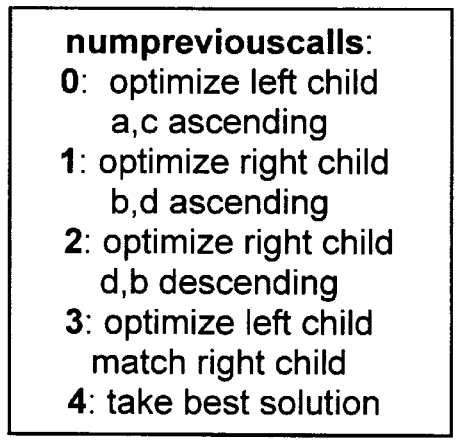
FIG. 14C

SYSTEM AND METHOD FOR OPTIMIZING DATABASE QUERIES WITH IMPROVED PERFORMANCE ENHANCEMENTS

This application is a continuation-in-part of Ser. No. 08/702,106, filed Aug. 23, 1996 now U.S. Pat. No. 5,822,747. Application Ser. No. 08/702,106 is hereby incorporated by reference.

The present invention relates generally to database query processing and specifically to rulebased database query optimizers.

BACKGROUND OF THE INVENTION

A central issue in the design of database systems is the query processing strategy that is employed. Considerable focus has been placed in this area since a poor strategy can adversely effect the performance of the database system. In SQL and similar query processing languages, a query can be expressed in a variety of different representations. Since the transfer of data that usually resides on secondary storage is slower than from main memory, it is imperative that the number of accesses to secondary storage be minimized. Typically, a user writes a query without considering the most efficient manner for realizing the query. This task becomes the responsibility of a query optimizer.

The objective of the query optimizer is to find an execution strategy that causes the result of the query to be produced in the most efficient ("optimal") manner. Optimality is used to denote the best strategy that satisfies a prescribed criteria. Often this criteria is the minimization of a defined metric, such as computational cost. Query optimization is a search process that entails producing a solution space of semantically equivalent expressions that represent the query. The semantically equivalent expressions are generated through the application of rules. The optimizer searches through the solution space finding the optimal solution that best satisfies the defined metric.

The complexity of the query optimizer is dictated by the size of the solution space and by the efficiency of the query optimization procedure. A large solution space increases the complexity of the search space since more expressions need to be considered by the query optimizer. In some situations, a number of redundant expressions are generated that needlessly burdens the optimizer and ultimately increases the execution time for the query. Inefficiencies in the query optimization procedure increase the execution time of a query as well. Accordingly, there is a need to minimize the execution time of a query by constraining the size of the solution space to those expressions that will produce more promising solutions and to utilize efficient search procedures in finding an optimal solution.

Prior Art Tandem Query Optimizer

The present invention and a prior Tandem query optimizer utilize a search engine and a database implementor (DBI) to generate an optimal plan for an input query having an optimization goal. Portions of the prior Tandem query optimizer have been the subject of publications but it was never commercially or publicly available. The search engine generates a solution space from which an optimal solution or plan is selected. The solution space is defined by a set of rules and search heuristics provided by the DBI. The rules are used to generate solutions and the search heuristics guide the search engine to produce more promising solutions rather than all possible solutions.

The database query is represented as a query tree containing one or more expressions. An expression is an operator that has zero or more inputs that are also expressions. An operator can either be logical, that is, an implementation-independent representation of an operation, or physical, that is, it represents a specific algorithm or implementation. Accordingly, the query optimizer utilizes two types of expressions: logical expressions that are composed of logical operators and physical expressions that are composed of physical operators. An implementation rule transforms a logical expression into an equivalent physical expression and a transformation rule produces an equivalent logical expression. The database query is initially composed of logical expressions. Through the application of one or more implementation and transformation rules, the logical expressions in the database query are transformed into physical expressions.

The search engine utilizes a search procedure that creates a "solution" for a database query by recursively partitioning the database query into one or more smaller subproblems. Each subproblem involves an expression that consists of an operator together with its inputs, if any. A solution for each such subproblem is created in accordance with an order. The order determines that the solution for each child of an expression is created before a solution for its associated parent expression is created.

Solutions are generated through the application of implementation and transformation rules. Transformation rules produce equivalent expressions and implementation rules produce plans. Each rule has a pattern and a substitute. A pattern is the before expression that is matched with the expression that is being optimized. A substitute represents the semantically equivalent expression that is generated by applying the rule. A rule's pattern matches an expression when the expression contains the same operators in the same position as the rule's pattern. Prior to applying a rule to an expression, all possible bindings that match a rule's pattern are determined. The purpose of a binding is to find all possible expressions that can match a rule's pattern in order to generate every possible equivalent expression.

The search procedure utilizes a branch and bound technique for generating solutions for each subproblem. An initial solution is obtained for each subproblem that has an associated cost which is used as an upper bound for considering other candidate solutions. Additional solutions whose associated costs exceed the upper bound are eliminated from consideration. The solution having the lowest cost is selected as the optimal solution.

The database query's optimization goal specifies a cost limit and a set of required physical properties. Typically, a required physical property specifies the characteristics that the output of an expression must possess. The database query's required physical properties are recursively and iteratively imposed on the expression that forms the database query such that the original required physical properties are satisfied. An expression imposes different subsets of its own required physical properties on its inputs. The search engine considers each distinct set of required physical properties as a separate optimization subproblem for an expression. The plan for an expression that is a parent utilizes the best plan for each of its inputs, from amongst all those that are created using the various required physical properties imposed by the parent expression. An example of a required physical property is the sort order of the result rows.

A search data structure is used to store the expressions that are generated during the search process including those that are eliminated from consideration. The search data structure is organized into equivalence classes denoted as groups. Each group consists of one or more logical and physical expressions that are semantically equivalent to one another. Initially each logical expression of the input query tree is represented as a separate group in the search data structure. As the optimizer applies rules to the expressions in the groups, additional equivalent expressions are added. Duplicate expressions are detected before they are inserted into the search data structure.

Each group in the search data structure also has one or more contexts. A context represents one or more physical expressions that form a plan and have a common set of required physical properties. Before the search engine generates a plan for a subproblem, it searches the search data structure for an existing plan that satisfies the requested required physical properties. The search engine traverses each context belonging to the subproblem's group and compares its associated required physical properties with the requested physical properties. Based on this comparison, the plans associated with a context are often searched for a plan that satisfies the required physical properties. If no optimal plan exists, the search engine then proceeds to generate one. Suitable plans found in comparable contexts serve as candidate solutions and as upper cost bounds.

In a preferred embodiment of the prior Tandem query optimizer, multiple passes of the optimizer are made for a database query. In a first pass, only a subset of the rules is used to generate the solutions. Preferably, this subset consists of implementation rules since they generate physical expressions and hence plans more readily. In each subsequent pass, a different set of rules is used in order to add more plans to the solution space. The rules used in the subsequent passes will usually include rules that were used in previous passes. At the completion of the desired number of optimizations passes, a best plan is selected from the plans generated.

While the prior Tandem query optimizer described above has functioned well in "laboratory" tests, the system has a number of shortcomings which limits its performance. In certain circumstances, the optimizer generates redundant expressions that needlessly burden the optimizer. This increases the intensity and complexity of the search.

In the prior Tandem query optimizer, the search for an optimal plan commences by searching for an existing plan that meets the required physical properties. This search is performed by comparing the required physical properties of each context associated with a certain group with the requested required physical properties. Based on the outcome of the comparison, the candidate plans associated with the context can be searched further for the requested required physical properties. A context represents plans having a set of required physical properties that is compatible with the context's required physical properties. Unfortunately, the comparison criteria is not specific enough to determine whether a context's required physical properties do not satisfy the requested optimization goal and often results in each candidate plan being searched. This needlessly increases the intensity of the search.

Another shortcoming of the prior Tandem query optimizer is that during optimization there are too few mechanisms to prevent the redundant application of a rule to an expression. Duplicate expressions are detected before they are inserted into the search data structure. However, detecting duplicate expressions at this point does not eliminate the computational burden incurred in generating the expression.

A further shortcoming is that the search engine considers every combination of optimization goals that an input of an expression can fulfill while creating a plan for its respective parent subproblem. Heuristics often can eliminate a large fraction of these combinations after finding plans for some of them. The consideration of these unproductive combinations needlessly burdens the search engine.

In the multipass optimizer, a different set of rules is used for each pass. The rules in each set can include rules that were used in previous passes. In some instances, the application of rules that were applied in previous passes generates redundant expressions. Although the redundant expressions are not stored in the search data structure, the generation of these expressions needlessly burdens the optimizer.

Another shortcoming is that there is no mechanism to detect infinite recursions that may occur during the optimization process. Infinite recursions can occur with a circular binding that binds an expression to more than one operator in the same rule's pattern. An infinite recursion can also occur when a subproblem is partitioned into a subproblem that is already being optimized (i.e., at the same tree position or at a higher tree position in the query tree).

It is an object of the present invention to provide a computationally efficient technique for processing database queries.

It is an object of the present invention to provide a method and system that efficiently tracks plans that are generated during the optimization procedure.

It is another object of the present invention to provide a method and system that provides an efficient method for searching for an optimal plan from one or more previously generated plans.

It is another object of the present invention to provide a method and system that utilizes heuristics in determining the optimization goals of the inputs of a subproblem.

It is another object of the present invention to provide a method and system that detects and avoids infinite recursions within the optimization procedure.

It is a further object of the present invention to provide a method and system that avoids the generation of redundant expressions while searching for an optimal plan.

It is a further object of the present invention to provide a search data structure that allows for multiple plans to be generated that utilize the same physical expression with a different optimization goal.

It is another object of the present invention to utilize existing plans having similar optimization goals although generated in a different optimization pass by reoptimizing the inputs to the plans.

Other general and specific objects of this invention will be apparent and evident from the accompanying drawings and the following description.

SUMMARY OF THE INVENTION

The present invention pertains to an improved method and system for optimizing SQL database queries. The query optimizer contains a search engine and a database implementor (DBI) that are used to generate an optimal plan for an input query having specified required physical properties. The search engine generates a solution space from which an optimal plan is selected. The solution space is defined by a set of rules and search heuristics provided by the DBI. The rules are used to generate solutions and the search heuristics guide the search engine to produce more promising solutions rather than all solutions.

The database query is represented as a query tree containing one or more expressions. An expression contains an operator having zero or more inputs that are expressions. The query optimizer utilizes two types of expressions: logical expressions, each of which contain a logical operator; and physical expressions, each of which contain a physical operator specifying a particular implementation for a corresponding logical operator. An implementation rule transforms a logical expression into an equivalent physical expression and a transformation rule produces an equivalent logical expression. The database query is initially composed of logical expressions. Through the application of one or more implementation and transformation rules, the logical expressions in the database query are transformed into physical expressions resulting in a solution.

In order to prevent or reduce the generation of redundant expressions, each rule is further classified as being context-free or context-sensitive. A context-free rule is applied once to an expression, while a context-sensitive rule is applied once to an expression for a particular optimization goal.

A search data structure is used to store the expressions that are generated during the search process including those that are eliminated from consideration. The search data structure is organized into equivalence classes denoted as groups. Each group consists of one or more logical expressions, zero or more physical expressions, zero or more plans, and zero or more contexts. The expressions contained in a group are semantically equivalent to one another. A plan exists for each optimization goal and represents one particular expression. A context represents plans having the same set of required physical properties. By explicitly distinguishing between plans and physical expressions, multiple plans can be generated from the same physical expression given different required physical properties.

Initially each logical expression of the input query tree is represented as a separate group in the search data structure. As the optimizer applies rules to the logical expressions, additional equivalent expressions, plans and groups are added. Duplicate expressions are detected and not inserted into the search data structure. Further, each logical expression contains indicators that track the rules that have been applied to it and in the case of a context-sensitive rule, associates it with the required physical properties. This tracking mechanism serves to eliminate the generation of redundant expressions that can occur when the rules are applied multiple times to an expression.

The search engine utilizes a search procedure that creates a solution for a database query by recursively partitioning the database query into one or more smaller subproblems. Each subproblem involves an expression that consists of an operator together with its inputs, if any. Each expression has a set of required physical properties that satisfy the requirements that are imposed by its parent. A solution for each such subproblem is created in accordance with an order. The order determines that the solution for each child of an expression is created before a solution for its associated parent expression is created. The solution for the database query is then obtained as a combination of the solutions for each of the expressions that form the database query.

The search procedure utilizes a branch and bound technique for generating solutions for each subproblem. An initial solution is obtained for each subproblem that has an associated cost which is then used as an upper bound for considering other candidate solutions. Additional solutions whose associated costs exceed the upper bound are eliminated from consideration. The solution having the lowest cost is selected as the optimal solution.

Before the search engine generates a plan for a subproblem, it searches the search data structure for an existing plan that satisfies the subproblem's required physical properties. The search engine compares each context's required physical properties with the subproblem's required physical properties in accordance with a five-fold compatibility criteria. The criteria includes an incompatible criterion which eliminates from consideration those contexts whose required physical properties are incompatible with the requested required physical properties. Otherwise, if the context's required physical properties are compatible but not the same as the requested required physical properties, each plan associated with the context is further searched. If no optimal plan exists, the search engine then proceeds to generate a plan.

A plan is generated through the application of one or more rules to a logical expression. The DBI contains search heuristics that select a set of rules for use in generating a plan for each subproblem. This set of rules can generate equivalent expressions as well as physical expressions. Each logical expression tracks the rules that have been previously applied to it. Context-free rules are applied only if they have not been previously applied to the expression and context-sensitive rules are applied only if they have not been previously applied to the expression for the particular set of required physical properties.

Furthermore, it is often the case that a parent subproblem's set of required physical properties can be satisfied by its inputs in a variety of ways, each of which forms a different combination of the parent's required physical properties. The DBI in the present invention dynamically determines which subset of the combinations the search engine should consider when searching for an optimal plan for the inputs.

In generating expressions and plans for a subproblem, the search engine detects circular bindings and large subproblem partitionings (i.e., where a subproblem is partitioned into a larger problem) in order to prevent infinite recursions. Each expression that is part of a binding is flagged and once bound does not become part of any other binding until its flag is cleared. Likewise, each context is flagged while it is being optimized and the search engine does not generate a plan for a context that is flagged.

In a preferred embodiment, the query optimizer performs multiple optimization passes. A first pass, using a certain set of implementation rules, is used to generate a first solution having a cost that is used as a threshold in subsequent passes. In one or more subsequent passes, a set of both implementation and transformation rules is applied to generate one or more additional plans each of which has a cost that does not exceed the threshold. The DBI includes an enable method that specifies the optimization pass or passes in which a rule can be applied.

In order to eliminate the redundant application of the same rules to the same expressions in subsequent passes, the optimizer will apply context-free rules only once for an expression and will apply context-sensitive rules only once for a particular expression and for a particular set of required physical properties.

Moreover, in each subsequent pass, the optimizer reoptimizes the inputs to existing plans having a set of required physical properties that match those requested in order to generate a plan having a lower cost. Each subsequent pass utilizes a different set of rules, which increases the likelihood that an optimal plan can be generated.

The search engine utilizes a series of tasks to implement the search procedure. Each task performs a number of predefined operations and schedules one or more additional tasks to continue the search process if needed. Each task terminates once having completed its assigned operations. A task stack is used to store tasks awaiting execution. The task stack is preferably operated in a last-in-first-out manner. A task scheduler is used to pop tasks off the top of the stack and to schedule tasks for execution.

BRIEF DESCRIPTION OF THE DRAWINGS

Additional objects and features of the invention will be more readily apparent from the following detailed description and appended claims when taken in conjunction with the drawings, in which:

FIGS. 14A–14C illustrate an example of the Create_Plan task.

DESCRIPTION OF THE PREFERRED EMBODIMENTS

Figure 1:
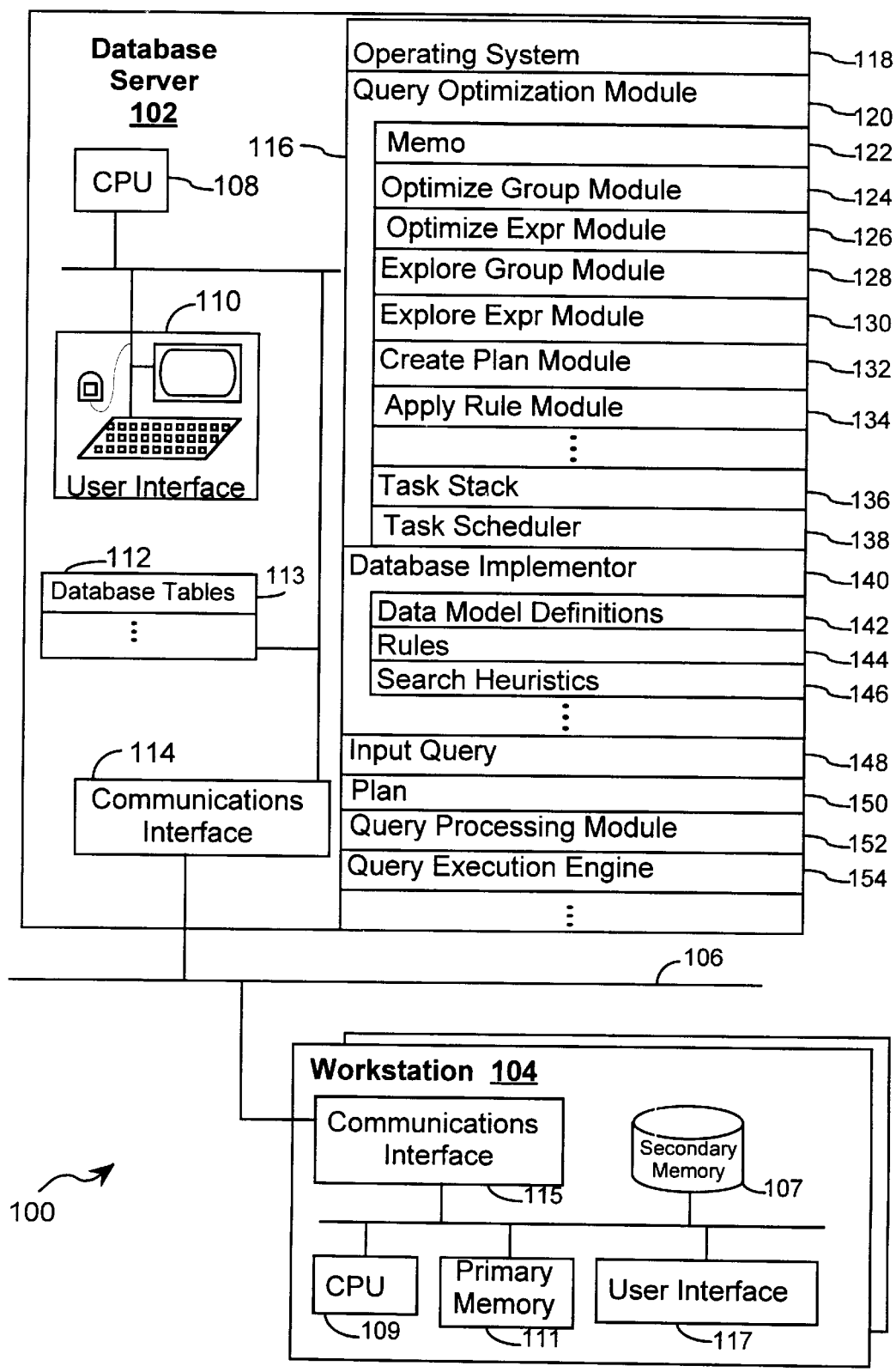
FIG. 1 is a block diagram of a computer system incorporating a preferred embodiment of the present invention.

Operation of the present invention will be explained by first giving an overview of how the present invention differs from the prior art Tandem query optimizer discussed in the background section of this document. The overview is then followed by a detailed explanation of the improved system and method.

Overview of Improved Query Optimization System and Method

The query optimization system and method of the present invention has many similarities to the prior art Tandem query optimizer. There are several improvements which will be described below.

The first improvement is the classification of the rules into one of two categories: context-free and context-sensitive. A context-free rule is independent of a particular set of required physical properties and a context-sensitive rule is dependent on a particular set of required physical properties. This distinction is used to prevent the repeated application of a rule to the same logical expression, which would otherwise result in redundant expressions. In the prior query optimizer, a duplicate expression was detected before the expression was inserted into the search data structure. However, at that point the search engine had incurred a considerable amount of computational expense in applying the rule (e.g., selecting the appropriate rules, performing the appropriate bindings, etc.) which need not have been performed. By classifying the rules into these categories, duplicate expressions can be avoided before they are generated.

This improvement is implemented by having each logical expression track the rules that have been applied to it. In the case of context-sensitive rules, each logical expression tracks the context-sensitive rules that have been applied to it and for a particular set of required physical properties as well. The Optimize_Expression task will place an Apply_Rule task on the task stack only in certain situations. The first situation is when the rule is a context-free rule that has not been previously applied to the expression. The second situation is for a context-sensitive rule that has not been previously applied to an expression for a particular set of required physical properties. Furthermore, the Explore_Expression task will utilize context-free transformation rules that have not been previously applied to the expression.

The second improvement pertains to utilizing the DBI to determine the combination of required physical properties that the search engine should consider when searching for an optimal plan for the inputs to an expression. Previously, the search engine considered every combination although only an optimal one was utilized. The DBI incorporates heuristics that are tailored to the particular data model and as such can dynamically narrow the combinations to a few that will produce more promising plans for each input. This improvement is manifested through the use of the createContextForChild method as part of the DBI which is utilized by the Create_Plan task.

The third improvement pertains to a more efficient method of searching the search data structure for an optimal plan that suits a specified set of required physical properties. Each context represents plans having similar optimization goals or required physical properties. In the prior optimizer, the comparison of two contexts would yield one of the four possible results, namely, LESS, GREATER, EQUAL, or UNDEFINED. The comparison criterion LESS indicates that the context's required physical properties are less stringent than those requested. A plan having less stringent required physical properties may or may not be suitable as an optimal plan. In this situation, each plan associated with the context is searched further.

The comparison criterion GREATER indicates that the context's required physical properties are more stringent than those requested. A more constraining plan can be suitable so each plan associated with this context is searched.

The comparison criterion EQUAL indicates that the context's required physical properties are the same as those requested.

An UNDEFINED criterion indicates that the context's required physical properties has one or more physical properties that are less constraining and one or more physical properties that are more constraining. In the UNDEFINED case, each plan is searched further for suitable plans.

The present invention adds a fifth criterion, INCOMPATIBLE, that distinguishes a context as not being able to fulfill both the context's set of required physical properties and the requested set of required physical properties simultaneously. In this case, the plans associated with the context are bypassed. This eliminates searching the plans associated with incompatible contexts.

The fourth improvement detects infinite recursions that can occur during optimization. In the prior optimizer, this occurred as a result of a circular binding and as a result of partitioning a subproblem into one of its parent subproblems. The present invention detects these situations by marking each logical expression that is currently bound to an expression and by marking each context that is currently being optimized. An expression can be bound to a rule's pattern only if it is not currently bound and a group is not made the subject of a new optimization task if it is currently being optimized.

The fifth improvement pertains to the multipass optimization scheme. In the multipass optimizer, plans from previous passes having a common set of required physical properties are utilized in subsequent passes. However, the inputs to these plans are reoptimized. Additional rules exist that were not applied previously. Application of those additional rules may generate a plan for the inputs having a lower cost.

A sixth improvement pertains to a more efficient method of tracking plans in the search data structure. Plans are distinguished from physical expressions by having a separate data structure that represents each physical expression that is finalized into a plan. Each context associated with a group represents the plans having the same set of required physical properties. In the prior optimizer, a physical expression was associated with one particular set of required physical properties. By distinguishing between plans and physical expressions, multiple plans can be generated from the same physical expression given different sets of required physical properties.

A seventh improvement pertains to an input query having a n-way join. The query processor structures the input query into a query tree such that the tables participating in the join are ordered by increasing table size. This results in the optimizer generating a more feasible plan during the first pass since joining smaller tables first is likely to produce a low cost plan.

System Architecture

Referring to FIG. 1, there is shown a computer system 100 for storing and providing user access to data in stored databases. The system 100 is a distributed computer system having multiple computers 102, 104 interconnected by local area and wide area network communication media 106. The system 100 generally includes at least one database server 102 and many user workstation computers or terminals 104.

In the preferred embodiment, the database server 102 can be a SQL database engine that manages the control and execution of SQL commands. The workstation computers 104 pass SQL queries to the SQL database engine 102. A user associated with a workstation computer 104 can transmit a SQL query to retrieve and/or modify a set of database tables 113 that are stored in the database server 102. The SQL database engine 102 generates an optimized plan for executing the SQL query and then executes the plan.

The database server 102 includes a central processing unit (CPU) 108, primary memory 116, a secondary memory 112, a communications interface 114 for communicating with user workstations 104 as well as other system resources not relevant here. The secondary memory 112 is typically magnetic disc storage that stores database tables 113. It should be noted that when very large databases are stored in a system, the database tables will be partitioned, and different partitions of the database tables will often be stored in different database servers. However, from the viewpoint of user workstation computers 104, the database server 102 appears to be a single entity. The partitioning of databases and the use of multiple database servers is well known to those skilled in the art.

The primary memory of the database server 102 can contain the following:

an operating system 118;
a query optimization module or query optimizer 120 that contains data structures and modules for generating a plan that optimizes the input query. The query optimizer can contain the following:
  a search data structure 122, denoted as Memo, that stores groups of semantically equivalent expressions;
  an Optimize Group task module 124 that obtains a plan for a particular group;
  an Optimize Expression task module 126 that determines a set of rules for use in generating one or more plans for a particular logical expression;
  an Explore Group task module 128 that determines whether a particular group requires exploration;
  an Explore Expression task module 130 that determines a set of transformation rules for generating one or more equivalent logical expressions;
  a Create Plan task module 132 that obtains plans for an expression and its inputs;
  an Apply Rule task module 134 that performs the application of one or more rules to an expression;
  a task stack 136 that stores one or more tasks generated by the query optimizer that are pending execution;
  a task scheduler 138 that manages the execution of the tasks on the task stack 136;
a database implementor (DBI) 140 which is a user-defined set of procedures that define a data model and which can containing the following:
  data model definitions 142;
  rules 144 that specify the possible mappings to generate additional semantically equivalent expressions; and
  search heuristics 146 that control the search strategy;
an input query 148 to be optimized;
a plan 150 that is best suited for implementing the input query;
a query processing module 152 that processes the input query and produces an optimal plan for implementing the input query; and
a query execution engine 154 that implements the optimal plan.

User workstations 104 typically include a central processing unit (CPU) 109, primary memory 111, a communications interface 115 for communicating with the database server 102 and other system resources, secondary memory 107, and a user interface 117. The user interface 117 typically includes a keyboard and display device, and may include additional resources such as a pointing device and printer. Secondary memory 107 can be used for storing computer programs, such as communications software used to access the database server 102. Some end user workstations 104 may be "dumb" terminals that do not include any secondary memory 107, and thus execute only software downloaded into primary memory 111 from a server computer, such as the database server 102 or a file server (not shown).

Glossary

To assist the reader, the following glossary of terms used in this document is provided.

Relational Expression: A relational expression is one that produces a table as its output, such as a join or scan. Relational expressions differ from value expressions that contain arithmetic operators and produce a value as an output. A relational expression can be a physical expression or a logical expression or both.

Logical Expression: A logical expression contains a logical operator of a certain arity (having a required number of inputs) and whose inputs are logical expressions. The arity of the logical operator is $\geq 0$. The inputs are also referred to as children or input expressions.

Physical Expression: A physical expression consists of a physical operator of a certain arity and whose inputs are physical expressions. Similarly, the arity of the physical operator is $\geq 0$. The inputs are also referred to as children or input expressions.

Logical Operator: A logical operator represents an implementation-independent operation (e.g., join or scan).

Physical Operator: A physical operator specifies a particular implementation method or procedure (e.g., hashjoin, mergejoin, etc.).

Expression tree: An expression tree corresponds to a relational expression having one or more logical or physical expressions. The expression tree consists of one or more nodes, each node is classified as a logical expression or a physical expression. Each node can contain zero or more inputs, each input being a relational expression. The expression tree consists of one or more levels, each level containing nodes that are inputs to a node of a preceding level. The root node represents a relational expression having the top-most operator and positioned in the first level.

Plan: A plan is an expression tree that consists solely of physical expressions. A plan is associated with a particular optimization goal and is considered complete when an associated cost and required physical properties is assigned to it. The term plan and solution are used in this document interchangeably.

Query tree: A query tree is an expression tree that corresponds to the input query that is to be optimized. The query tree contains one or more nested logical expressions.

Optimization rule: An optimization rule defines how the optimizer is to transform the input query into other semantically equivalent forms. In this application, there are two types of optimization rules: transformation rules and implementation rules. A transformation rule produces equivalent logical expressions and an implementation rule produces equivalent physical expressions.

Transformation rule: A transformation rule transforms a logical expression into a semantically equivalent logical expression (e.g., join associativity and commutativity).

Implementation rule: An implementation rule transforms a logical expression into a semantically equivalent physical expression by substituting one or more logical operators in the logical expression with physical operators (e.g., join may be implemented by mergejoin). The repeated application of implementation rules results in a plan that consists only of physical expressions.

Pattern and Substitute: An optimization rule consists of a pattern and a substitute, both of which are expression trees. The pattern is the before expression that is matched with the expression that is being optimized. The substitute represents the semantically equivalent expression that is generated by applying the rule. A rule's pattern matches an expression when the expression contains the same operators in the same position as the rule's pattern.

Cut operator: A cut operator is an input to a rule's pattern that can be matched to any operator. It occurs as a leaf node in a rule's pattern and matches any node of an expression tree.

Tree operator: A tree operator is an input to a rule's pattern that is matched to an entire expression tree. It occurs as a leaf node in a rule's pattern and matches an entire expression tree.

Memo: A memo is a search data structure used by the optimizer for representing elements of the search space. The Memo is organized into equivalence classes denoted as groups. Each group consists of one or more logical and physical expressions that are semantically equivalent to one another. Expressions are semantically equivalent if they produce the identical output. Initially each logical expression of the input query tree is represented as a separate group in Memo. As the optimizer applies rules to the expressions in the groups, additional equivalent expressions and groups are added. Each group also contains one or more plans and contexts. A context represents plans having the same optimization goal.

Physical properties: A physical property specifies the manner for representing the output of an expression. Typically, the physical property is used to indicate a sort order (e.g., sorted by (a,b)), a compression status, or used to indicate partitioning for parallel and/or distributed systems.

Optimization goal: An optimization goal represents the required physical properties and the cost limit to be used for optimizing an expression. The terms "optimization goal" and "required physical properties" are used interchangeably for those instances when the optimization goal is not associated with a cost.

N-way join: An expression tree including n-successive join expressions, each join expression having zero or more input expressions that are join expressions and at least one input expression that is a table expression.

The Query Processing System

Figure 2:
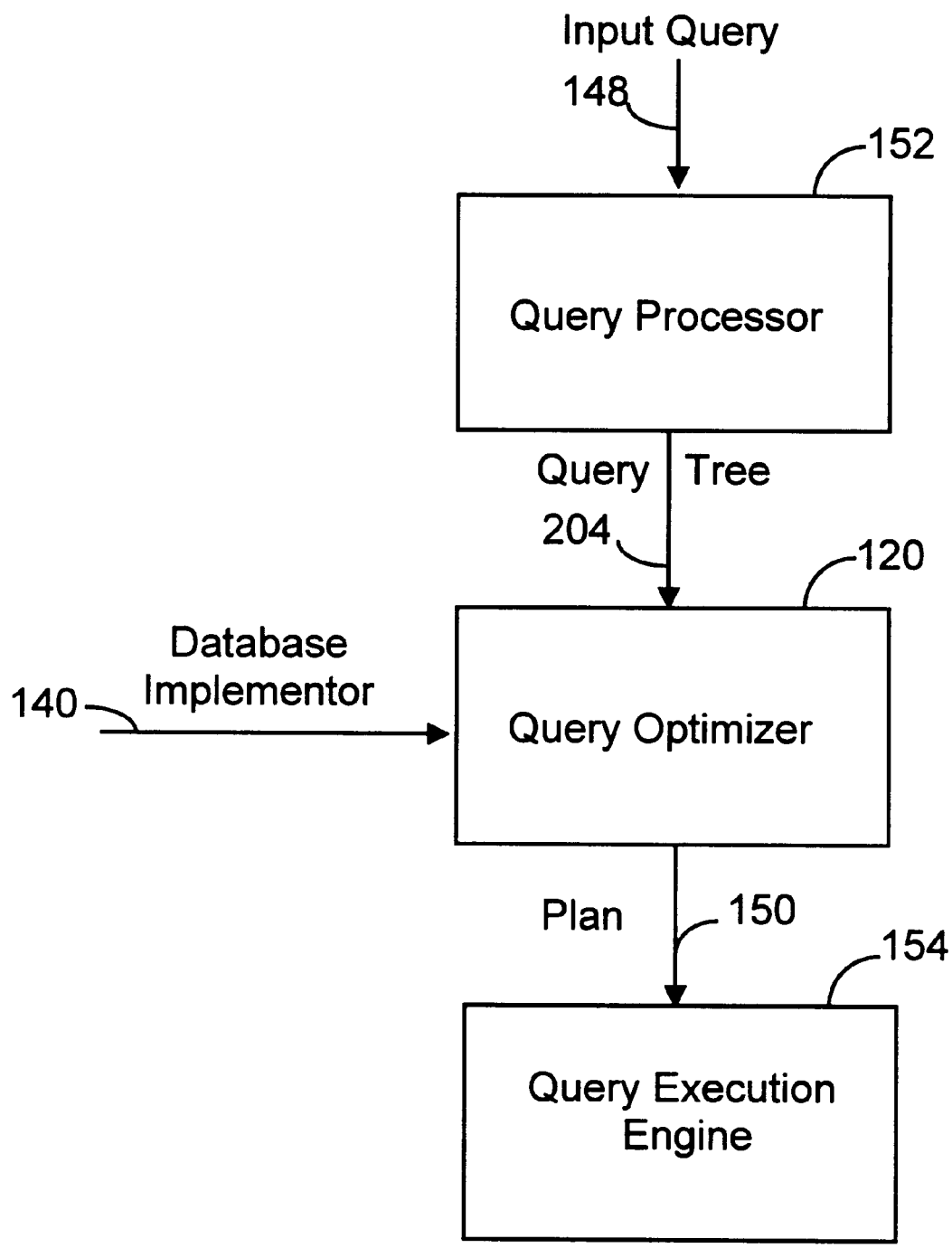
FIG. 2 is a block diagram of the processing modules that are used to execute a database query in a preferred embodiment of the present invention.
Figure 3A:
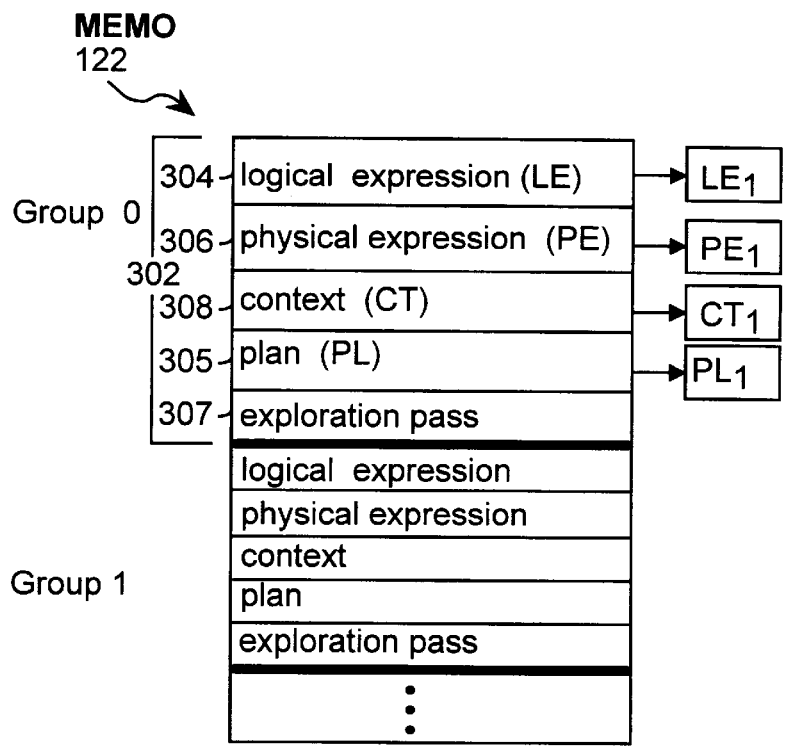
FIGS. 3A–3E are block diagrams of the Memo search data structure in a preferred embodiment of the present invention.
Figure 3B:
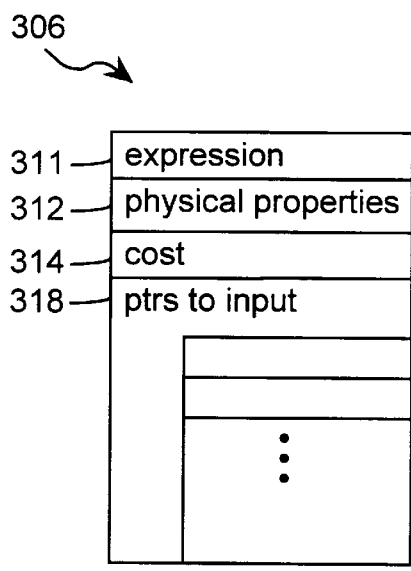
Figure 3C:
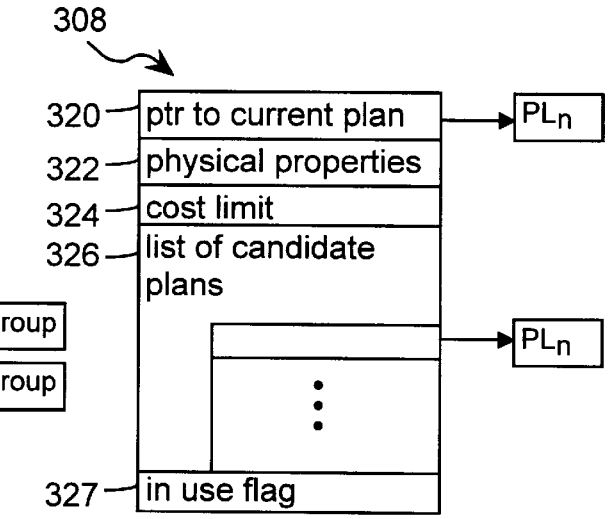
Figure 3D:
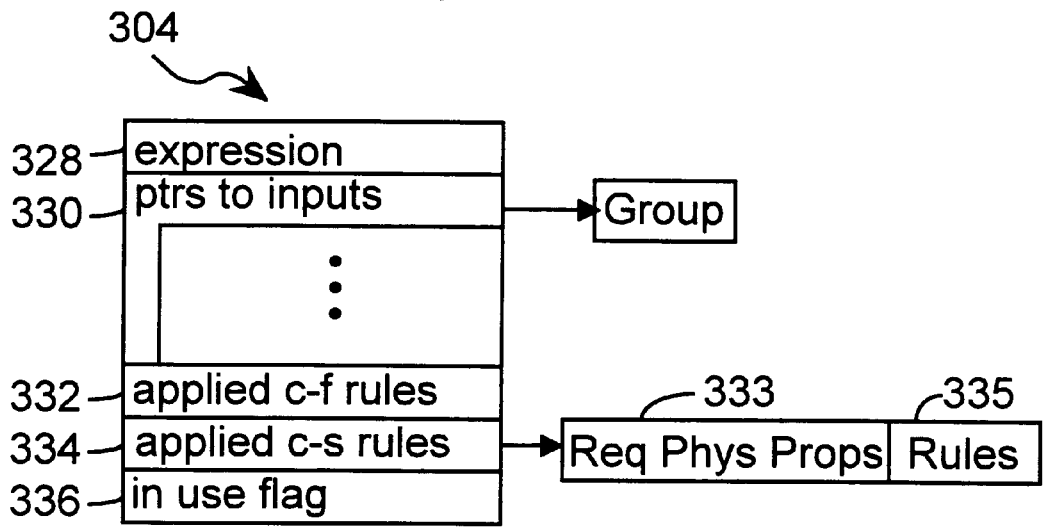
Figure 3E:
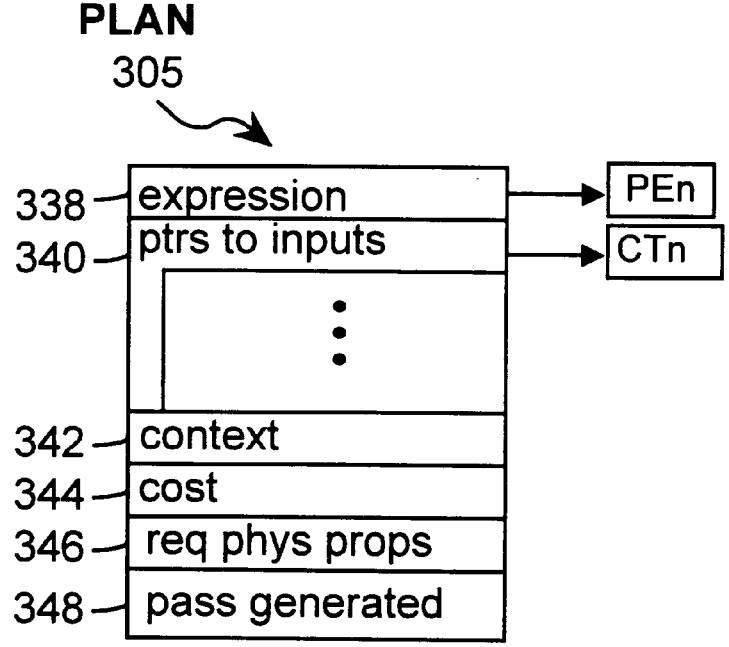
Figure 4:
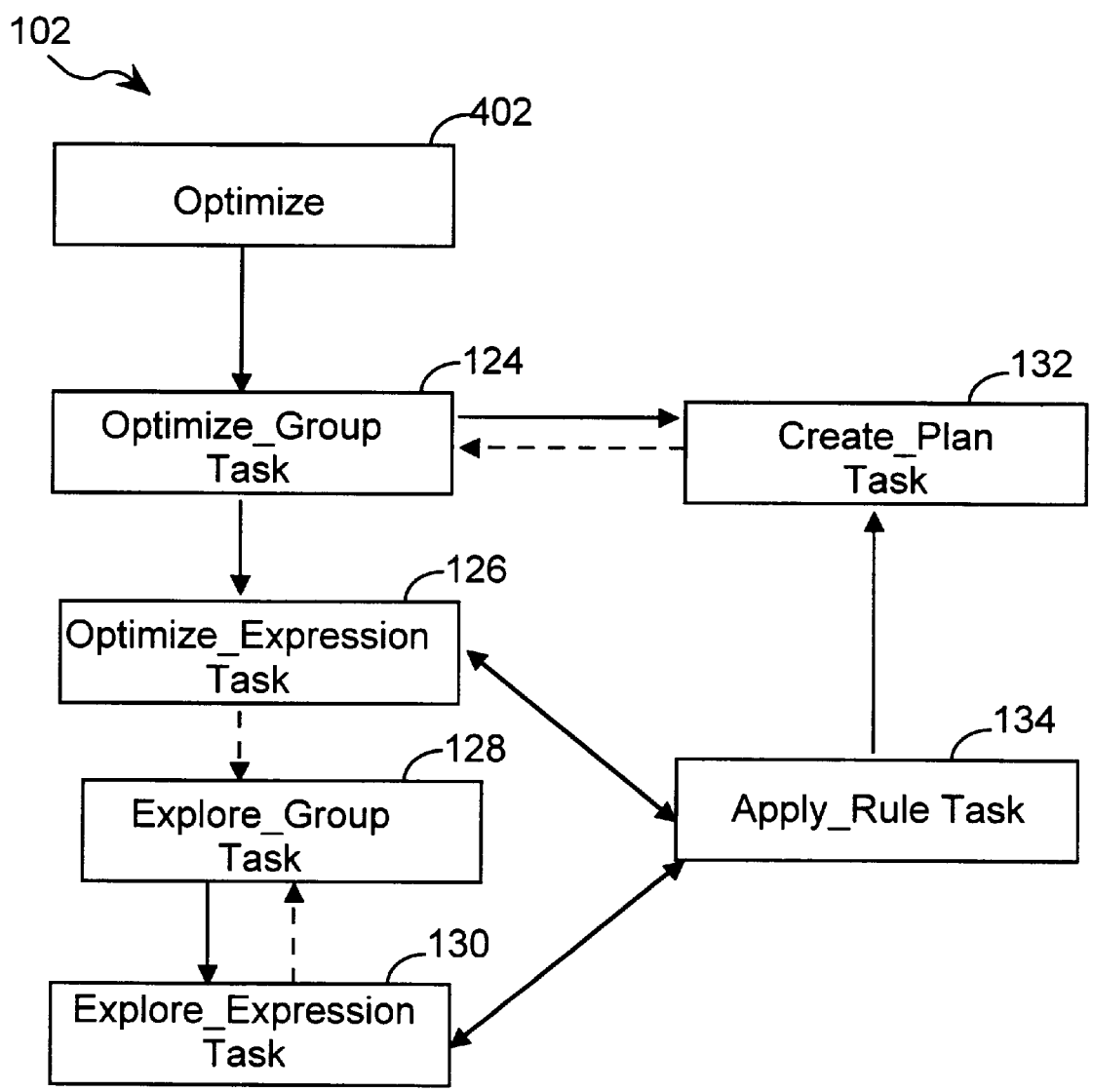
FIG. 4 is a block diagram of the task structure in a preferred embodiment of the present invention.
Figure 5:
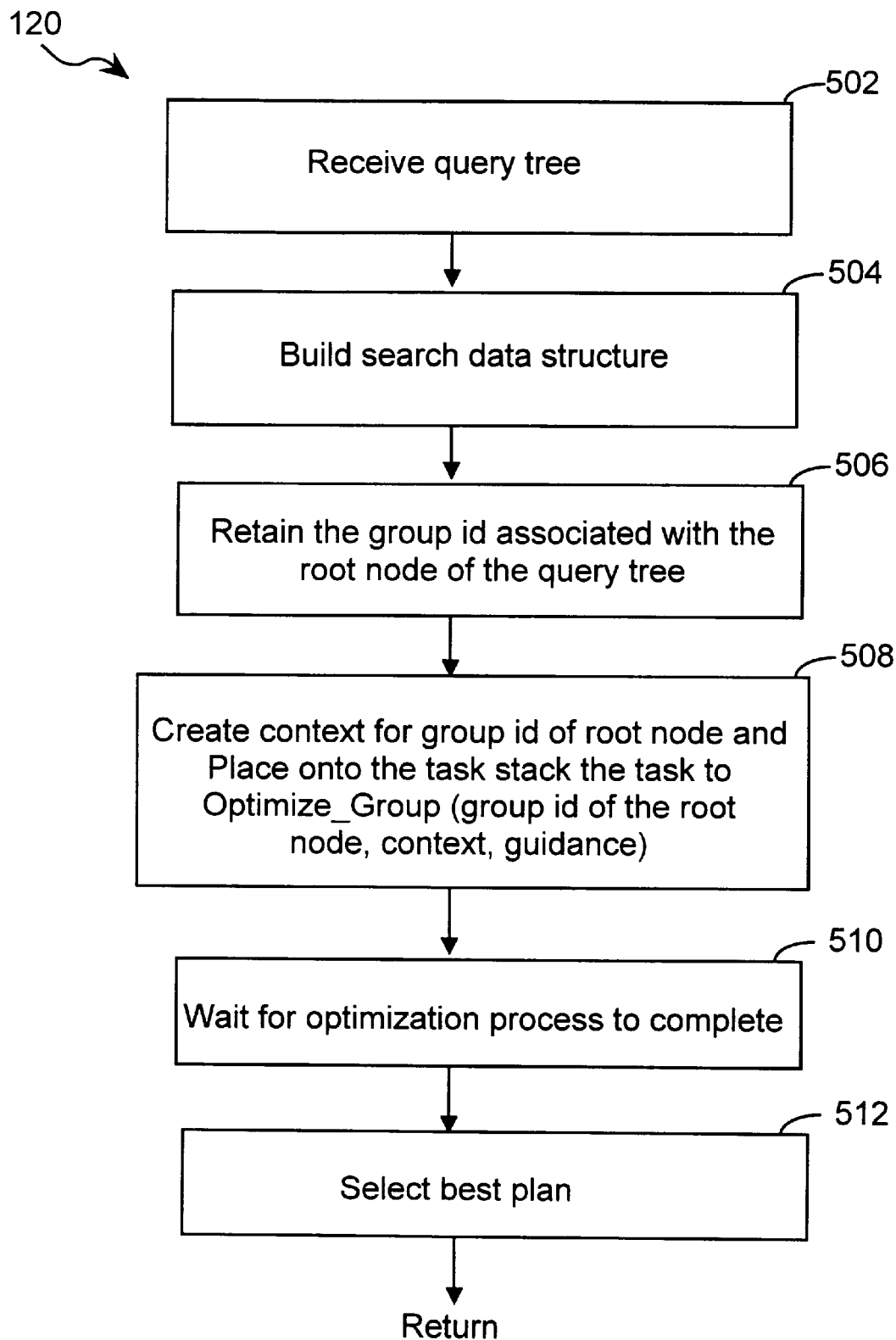
FIG. 5 is a flow chart of the preferred embodiment of the optimize procedure of the present invention.

FIG. 2 illustrates the execution path of a database query in the preferred embodiment of the present invention. Initially, a user transmits to the database server 102 an input query 148 instructing the database server 102 to perform certain operations. The input query 148 is typically written in a query processing language such as SQL (Structured Query Language). The input query 148 is processed by a query processor 152 that includes a parser (not shown) which converts the input query 148 into an internal representation referred to as a query tree 204. The query tree 204 represents the expression to be optimized along with any required physical properties. The query processor 152 structures the query tree 204 in a manner that is beneficial for the query optimizer 120. For example, if the input query 148 has a n-way join, the query processor 152 structures the query tree 204 such that the tables participating in the join are ordered by increasing table size. This results in the query optimizer 120 generating a more feasible plan, in the first optimization pass, since joining smaller tables first is likely to produce a low cost plan.

The query processing system 152 utilizes a query optimizer 120 to generate one or more alternate execution plans. Associated with each plan is a cost for executing the plan. The query optimizer 120 chooses the plan 150 having minimal cost which is used by the query execution engine 154 to execute the input query 148.

The query optimizer of the present invention is composed of a search engine and a database implementor (DBI) 140.

The search engine executes a series of tasks that generate one or more plans to implement the input query 148. The DBI 140 provides the data model definitions 142, rules 144, and search heuristics 146 that guide the manner in which the tasks generate plans. The DBI 140 is provided by the user and can vary for each application. By organizing the query optimizer in this manner, the optimizer is made extensible and independent of a particular data model. Additional operators and rules can be added to the DBI 140 without effecting the search engine. Likewise, the search engine can be applied to a variety of data models without altering its structure.

The Database Implementor (DBI) 140 is a user-defined set of data definitions and methods that define a user's data model. The DBI can contain three parts: (1) the data model definitions 142 that list the operators and methods of the data model that are to be considered when constructing and comparing plans; (2) rules 144 for transforming the expressions in the query tree into one or more plans; and (3) search heuristics 146 that efficiently guide the search process to generate viable plans.

In the preferred embodiment, the data model distinguishes between operators (or logical expressions) and methods (or physical expressions). An operator corresponds to a primitive provided by the data model. Examples of operators include join, intersection, and select. A method is a computer procedure that implements the operator. For example, hashjoin and mergejoin are methods that implement the operator join. An operator can often be implemented using several alternative methods.

Operators and methods are defined by data declarations. Furthermore each method has an associated code segment that implements the method. The following example illustrates a data declaration used in a particular data model.

$$\% \text{ operator } 2 \text{ join} \qquad (1)$$

$$\% \text{ method } 2 \text{ hash\_join loops\_join cartesian\_product} \qquad (2)$$

In this example, the keyword operator and method are followed by a number to indicate the arity and are followed by a list of associated operators or methods. The operator join has an arity of 2 thereby requiring two inputs. The method declaration indicates that the three methods hash_join, loops_join, and cartesian_product have an arity of 2.

The second part of the DBI contains the transformation and implementation rules. A transformation rule defines a legal transformation of an expression. An implementation rule defines the correspondence between an operator and a method. A user can specify the rules by data definitions as illustrated by the following example.

$$\text{Join } (cut_1, cut_2) \rightarrow ! \text{ Join } (cut_2, cut_1) \qquad (3)$$

$$\text{Join } (cut_1, cut_2) \text{ by Hash\_Join } (cut_1, cut_2) \qquad (4)$$

The first line of this example defines the join commutativity transformation rule. The arrow is used to indicate the legal direction of the transformation. In this example, the arrow combined with the exclamation mark is used to indicate that the rule is applied only once since applying a join commutativity rule twice results in the original form. The second line of this example defines an implementation rule specifying that the Hash_Join method is a suitable implementation of a Join.

The expression on the left side of a rule is considered the pattern and the expression on the right side is the substitute. Some leaves of the rule's pattern are represented by a special operator called a "cut" operator. A cut operator matches any other expression. The pattern indicates a logical operator, such as join, having a prescribed form, such as two inputs cut, and $cut_2$ and in a particular order where input $cut_1$ is considered the first input and input $cut_2$ is considered the second input. The substitute indicates either a logical or physical operator having a prescribed form. In the above example, the substitute for the transformation rule is a join operator having the inputs in the reverse order as the pattern. The substitute for the implementation rule specifies the hashjoin operator having two inputs and in a particular order.

A rule is applied by matching the rule's pattern with an expression and producing a new expression having the form specified by the substitute. Each operator in the expression is matched with each operator in the pattern in the same position. For example, when the Join commutativity rule (specified in equation (3) above) is applied to expression Join (scan $t_1$, scan $t_2$), the Join operator of the expression is matched with the Join operator of the rule's pattern. The expression scan $t_1$ is matched with the first input and the expression scan $t_2$ is matched with the second input. The result of the application of the rule is an expression having the form of the substitute which is Join (scan $t_2$, scan $t_1$).

The third part of the DBI consists of search heuristics that guide the optimizer's search. The search heuristics can contain the following:

- a createContextForChild method that generates a context (part of the search data structure which is discussed below) for an expression's input with selected required physical properties that are a subset of a parent expression's required physical properties;
- an enable method that indicates the particular optimization pass or passes in which a rule can be applied;
- match methods that match a particular operator with a rule's pattern;
- cost functions that associate a cost with a particular expression;
- promise functions that reorder the rules to be applied on expressions, or suppress the application of rules on certain expressions;
- cutoff methods that limit the number of rules applied on a certain expression; and
- guidance methods that generate information pertaining to the selection of rules for subsequent rule applications.

The createContextForChild method is used to generate a context for each input to an expression with a selected set of required physical properties. An expressions's required physical properties can be combined into different combinations, with each combination specifying a different set of required physical properties for the inputs to an expression. The createContextForChild method utilizes heuristics in determining which combinations the search engine should consider. The heuristics take into consideration the data model and as such can limit the number of combinations to those that will produce more promising plans for the inputs.

The enable method enables a rule for one or more optimization passes. In the Optimize_Expression and Explore_Expression tasks, the optimizer utilizes the DBI to select one or more rules to apply to a particular expression. The DBI uses the enable method to determine if a particular rule is eligible for consideration for a particular pass.

The cost functions are used to generate a cost for a particular operator. The traditional combination of expected CPU time and I/O time can be used as a basis for determining this cost.

The enable method, match methods, promise functions, cutoff methods, and guidance methods are used to determine the rules that are to be applied to a particular expression. The enable method determines if the rule is to be considered for the particular pass. Match methods are used to match an operator with a rule's pattern. Promise functions have an associated value that indicate the usefulness of a rule in a particular context. The cutoff methods also have an associated value that is used to determine which rules are to be applied to a particular expression. A further elaboration of these concepts will be described in more detail below.

The guidance methods produce guidance structures which are heuristics that are passed from one task to another and are used to select rules which will generate more promising solutions. The heuristics capture knowledge of the search process which is passed onto subsequent tasks in order to eliminate generating unnecessary and duplicate expressions. The optimizer of the present invention utilizes a task structure where each task operates in an independent manner. As such, there is no communication between tasks. The guidance structures serve as a means to pass search information from one task to subsequent tasks in order to effect future search activity.

Guidance is provided at different points in the search process. (For the purpose of this application, the terms guidance and guidance structure are used interchangeably.) The search process entails an exploration phase and an optimization phase (which is explained in more detail below). During the optimization phase, plans are generated through the application of rules for one or more expressions. Guidance is provided to efficiently select those rules that will produce more promising plans in light of the previous search activity. This guidance (e.g., optGuidance) is provided after an application of a rule creates a new logical expression and when plans are sought for an expression's children (e.g., optInputGuidance). In the exploration phase, all possible logical expressions that match a rule's pattern are generated. Guidance is provided during this phase in order to eliminate the generation of unnecessary logical expressions in light of previous transformations. This guidance is provided whenever a group (e.g., expIInputGuidance) or an expression (e.g., expIGuidance) is explored.

For example, in exploring an expression guidance can be provided to indicate that a join commutivity rule should not be applied twice to an expression (i.e., again to its substitute). Further, when exploring a join pattern, it may be unnecessary to apply a rule that transforms a union operator or a scan operator into a logical expression that does not involve joins. Guidance can also be used to enable rules that are not usually enabled, such as a rule that generates an unusual physical expression such as an input expression using a bitmap-index scan.

Search Data Structure

In the preferred embodiment, the query optimizer utilizes a search data structure denoted as Memo. Memo is a search tree that is used to store expressions that are analyzed during the search. The Memo is organized into equivalence classes denoted as groups. Each group consists of one or more logical and physical expressions that are semantically equivalent to one another, one or more plans, one or more contexts, and an exploration pass indicator. Initially each logical expression of the input query tree is represented as a separate group in Memo. As the optimizer applies rules to the expressions, additional equivalent expressions, groups, contexts, and plans are added.

Referring to FIGS. 3A–3E, the Memo 122 consists of one or more groups 302, where each group 302 contains an array of pointers to one or more logical expressions 304, an array of pointers to one or more physical expressions 306, an array of pointers to one or more contexts 308, an array of pointers to one or more plans 305, and an exploration pass indicator 307. A logical expression, physical expression, context, and plan are described in more detail below. An exploration pass indicator 307 indicates for each pass whether or not the group has been explored. Preferably, the exploration pass indicator is a bitmap having n bits with one or more bits representing a particular pass and indicating whether or not exploration was performed in the pass.

Each logical expression 304 is represented as a data structure that stores the particular expression 328 and has pointers 330 to the group of each input expression. In addition each logical expression 304 has a bit map 332 that is used to specify the context-free rules that have been applied to the logical expression 304. There is also a list of pointers 334 to a data structure including the required physical properties 333 and context-sensitive rules 335 that have been applied to the logical expression 304. The list of context-sensitive rules 335 is preferably a bit map with one or more select bits indicating whether or not a particular context-sensitive rule has been applied to the logical expression 304. An in use flag 336 is also part of the logical expression 304 and when set, indicates that the logical expression is currently bound to a rule's pattern. The in use flag 336 is used to prevent a problem referred to as circular binding.

Each physical expression 306 is represented as a data structure that stores the particular expression 311, the physical properties 312 associated with the expression, the cost 314 associated with the expression, and an array of pointers 318 to the groups of each input expression.

A plan 305 represents a physical expression 338 that is assigned required physical properties 346 and a cost 344 that is within the desired cost limit. The plan 305 also includes a pointer to a corresponding context 342, pointers to the contexts of each of its inputs 340, and the pass in which the plan was generated 348.

A context 308 is a data structure that represents one or more plans for a particular group having similar or compatible required physical properties. A context 308 includes a pointer 320 to the current plan, required physical properties 322, a cost limit 324, a list of candidate plans 326, and an in use flag 327. For a particular expression, there may be several plans that meet the cost limit 324. The list of candidate plans 326 includes a pointer to each of these plans. The current plan 320 is the candidate plan having the lowest cost. The in use flag 327 is used to indicate when a plan associated with the context is currently in use. This is used to avoid infinite recursion.

Search Procedure

The query optimizer of the present invention utilizes a search procedure to generate a number of feasible solutions from which an optimal solution is selected. Initially a feasible solution is generated whose associated cost is used as an upper bound for searching for other solutions. The search continues generating other solutions eliminating those that have an associated cost that exceeds the upper bound. When the search has exhausted all candidate solutions, the solution having the lowest cost is selected as the optimal solution.

The search procedure generates a solution by partitioning the input query into one or more subproblems when the input query consists of nested expressions. An expression is defined recursively as containing an operator with zero or more inputs that are expressions. Each subproblem contains one or more expressions. The subproblems form a tree in which some of the subproblems are inputs to other subproblems. A solution for each input subproblem is generated before a solution for its associated parent subproblem is generated. Thus, the subproblems are analyzed in accordance with an order that traverses the subproblem tree in a bottom-up manner. Those subproblems not having inputs are analyzed first making it possible to graduate up the tree to subproblems utilizing these inputs.

The inputs are numbered such that the left-most input is considered the first input, the right-most input is considered the last input, and those inputs in between are numbered sequentially relative to the first and last input. The input subproblems are analyzed in DBI-specified order. Once all the subproblems are analyzed, a solution for the database query is obtained as the combination of the solutions for each of the subproblems.

For each subproblem for which a solution is desired, a set of rules is selected that is used to generate the solution space for the particular subproblem. The set of rules can consist of both context-free and context-sensitive implementation and transformation rules. These rules are used to generate one or more solutions for the particular subproblem. The choice of rules is selected so as to constrain the size of the solution space to feasible solutions rather than all possible solutions. This selection is guided by the various functions in the DBI (e.g., enable methods, guidance methods, promise functions, search heuristics, and cutoff functions).

Once the set of rules or solution space for a particular subproblem is determined, the search procedure employs a branch and bound technique to determine which solutions to generate. This search is performed for each subproblem for which a solution is sought. Solutions whose associated cost does not exceed an upper bound are generated while those that exceed this bound are pruned. This eliminates the number of solutions that need to be considered, thereby producing a more efficient search procedure.

The search procedure partitions the query tree into a number of subproblems based on the rules selected for transforming the expressions in the query tree into physical expressions. The search procedure starts at the root expression selecting one or more rules for transforming the logical operator included in the root expression into an equivalent physical expression. The root expression is often considered a subproblem. Based on the rule applied, the query tree is further partitioned into one or more subproblems where each subproblem contains expressions requiring equivalent physical properties. Often each input to a rule is considered an additional subproblem. The input subproblem can then be partitioned further into additional subproblems based on the rules selected for application to the top expression contained in the subproblem.

Each subproblem can be optimized or explored. In optimizing a subproblem, one or more rules, including any combination of context-free/ context-sensitive implementation/transformation rules are applied to one or more operators in the subproblem in order to generate a plan. By exploring a subproblem, one or more transformation rules are applied to one or more operators in the subproblem in order to generate additional equivalent expressions. Exploration occurs when the input to the top node of a rule's pattern specifies a particular operator rather than a cut or tree operator (the tree operator is described in detail below). Exploration is performed on a subproblem immediately preceding the optimization of the subproblem. This is done in order to produce equivalent expressions or groups that can be utilized in the optimization step. By performing explorations in this manner, only those equivalent expressions that will produce more promising solutions in the subsequent optimization are generated rather than all possible transformations.

The Memo search structure tracks each solution or plan considered by the search engine, even those that are eliminated from consideration due to their excessive cost. However, duplicate expressions can be generated during the search process. A redundancy check is performed before an expression is stored in the Memo search structure. This check eliminates the retention of duplicate expressions in the Memo search structure.

Multipass Optimization

In a preferred embodiment of the present invention, multiple optimization passes are performed. During the first optimization pass, only those rules that are necessary to generate a feasible plan with a reasonable cost are enabled. Typically, a subset of implementation rules are enabled. Where there exists multiple implementation rules for the same logical expression, the most economical rule which provides a reasonable cost limit is chosen. For example, among the join implementation rules, only the hashjoin rule might be enabled during the first pass. The nestedjoin rule, while providing a good cost limit, has the potential for increasing the search space since new expressions are added with join predicates. The mergejoin rule can be an expensive rule to enable since the children of the mergejoin are optimized for alternate orderings. Similarly, since transformation rules have the potential for increasing the search space without the added benefit of generating feasible plans, transformation rules are deferred for later passes.

Subsequent passes can then use the costs generated in previous passes as an upper bound, allowing for more cost-based pruning. This has the effect of generating the optimal plan while exploring a smaller search space and reducing the execution time of the optimizer.

The search data structure retains its content between optimization passes. Thus, a subsequent pass can utilize solutions obtained in a previous pass. Each plan is identified with the pass in which it was generated. As subsequent passes are made, the optimizer considers those plans generated in previous passes having the same required physical properties but reoptimizes their inputs since additional rules exist that can generate a lower cost plan.

Figure 12:
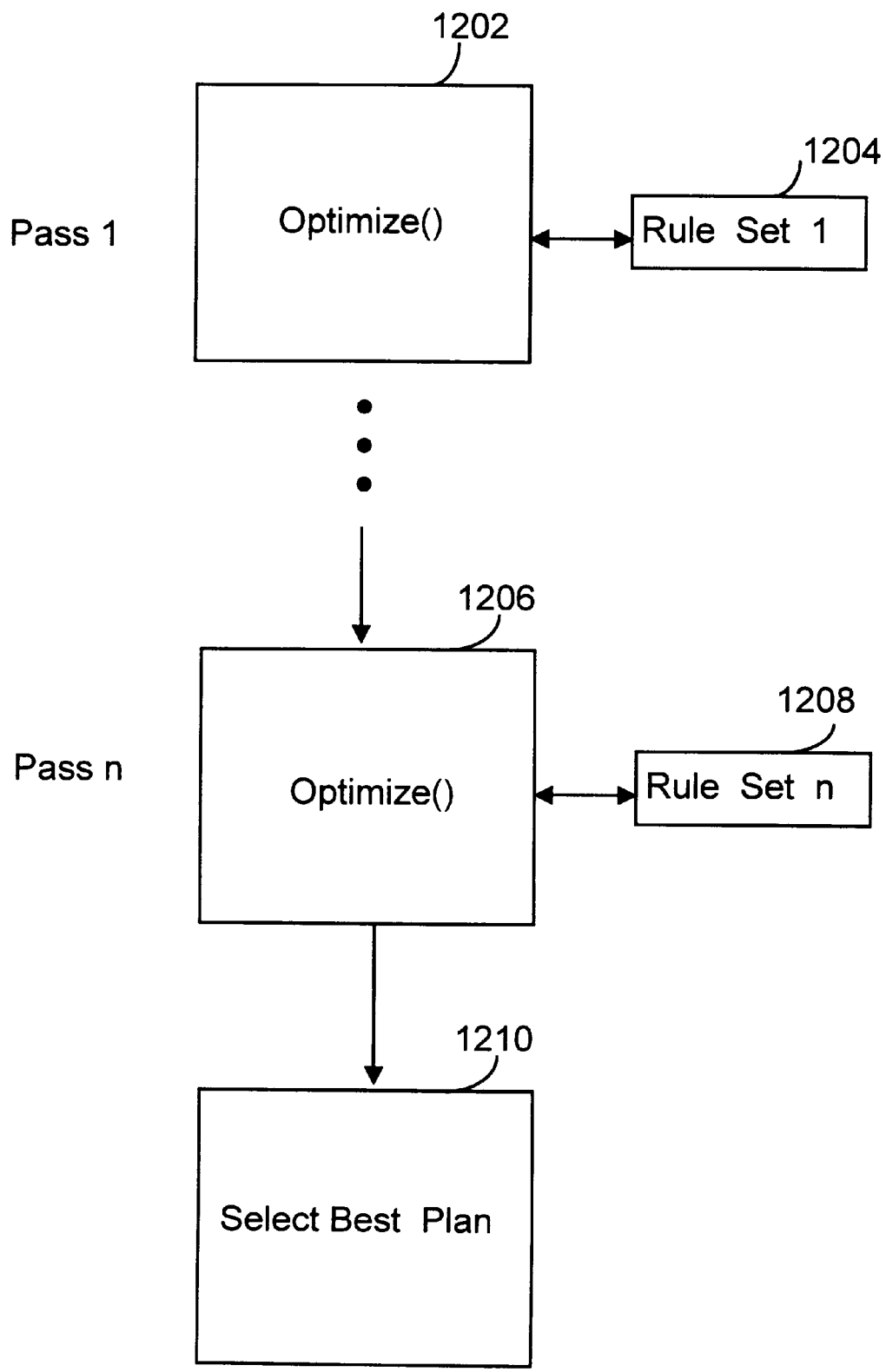
FIG. 12 illustrates the multipass optimization scheme.

Referring to FIG. 12, in the preferred embodiment of the present invention, a first pass (step 1202) through the optimizer is used to generate one or more solutions for the input query. In this first pass, only those rules 1204 that are enabled for the pass are used to generate the solutions. Preferably, this subset consists of implementation rules since they generate physical expressions and hence plans more readily. In subsequent passes (step 1206), additional rules 1208 are available in order to add plans to the solution space. At the completion of the desired number of optimization passes, a best plan is selected (step 1210) from the plans included in the search data structure.

Task Structure

The aforementioned search procedure is implemented by the search engine as a set of tasks. Each task performs predefined operations and invokes one or more additional tasks to continue the search if needed. Each task terminates upon completion of its assigned operations. A task stack is utilized to store tasks that are awaiting execution and is preferably operated in a last-in-first-out manner. A task scheduler reads tasks from the top of the task stack and schedules one or more of the tasks that are pending execution.

The task structure is advantageous for providing parallel searching in a multiprocessor environment. The task structure can be represented by a program dependence graph that captures dependencies or the topological ordering among the tasks. This ordering is then used by the task scheduler to schedule one or more of the tasks to execute on one or more processors.

The task structure is also amenable for use in an object-oriented processing environment. Preferably, each task can be represented as an object with each object having an associated method defining the operations to be performed. Task objects offer flexibility since a task object can be instantiated several times for different situations and each instantiation can be placed onto the task stack for execution.

Referring to FIGS. 1–5, the optimize procedure 402 receives an input query 148 in the form of a query tree 204 (step 502) and builds a Memo search data structure 122 containing each logical expression in the query tree 204 (step 504). Initially, each node of the query tree 204 contains an expression that is placed in a separate group in Memo 122 (step 504). Next, the group number containing the root node of the query tree is retained (step 506). This will be used at a later point to retrieve the plans generated for the input query. The optimize procedure 402 then places onto the task stack the Optimize_Group task 124 with the group number of the root node and the required physical properties (included in the associated context) (step 508). The procedure then waits for the completion of the optimization process which is indicated by the task stack being empty (step 510). Multiple optimization passes can execute before the task stack is emptied. At the completion of the optimization process, the contexts in the group number of the root node is scanned. The plan having the lowest cost is selected as the optimal plan to execute the input query (step 512).

The Optimize_Group task 124 is used to obtain a plan for a specified group having certain physical properties. If no such plan exists, the task initiates those tasks that will generate zero or more plans for the specified group having the required physical properties.

Figure 6:
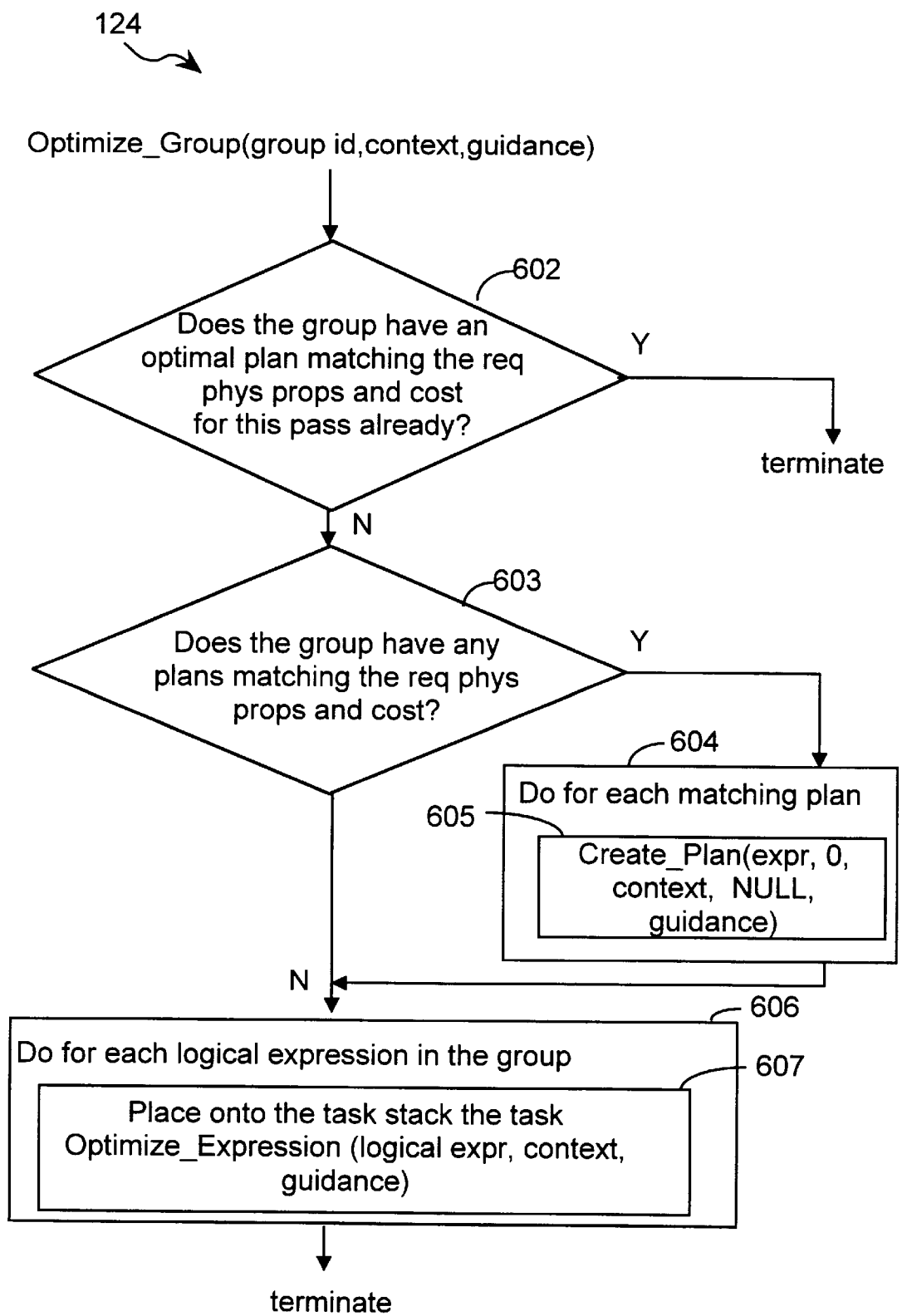
FIG. 6 is a flow chart of the Optimize_Group task in a preferred embodiment of the present invention.
Figure 13:
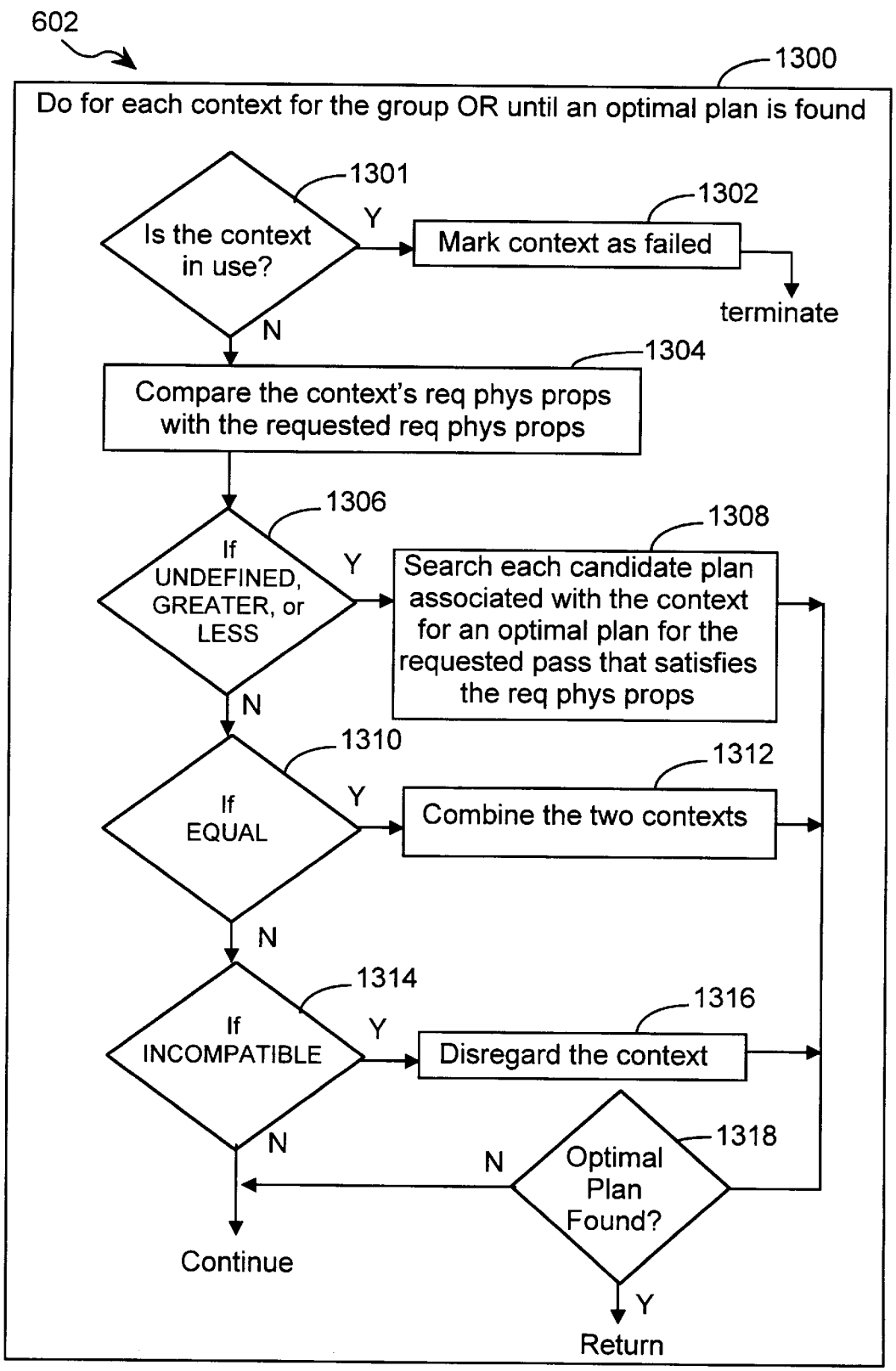
FIG. 13 is a flow chart illustrating the steps used in searching for an optimal plan for a particular group and pass.

Referring to FIG. 6, the Optimize_Group task 124 determines whether an optimal plan for the current pass matching the required physical properties and cost exists for the specified group (step 602). The required physical properties and cost are contained in the context that is passed to the task. Referring to FIG. 13, the Optimize_Group task 124 traverses each context in the requested group or until an optimal plan is found, if any (step 1300). The first optimal plan that is found is used. A check is made to determine if the searched context has its in use flag set (step 1301). If so, then the input context is marked as failed (step 1302) and the task is terminated. A searched context having its in use flag marked indicates that an existing context for the same group is already in the process of being optimized. This signifies an endless loop in the optimization procedure, which is blocked or stopped by terminating the consideration of this context.

Otherwise, the searched context's required physical properties is compared with the required physical properties of the input context (step 1304). There are five possible comparison results: UNDEFINED, LESS, GREATER, EQUAL, or INCOMPATIBLE. The comparison criterion LESS indicates that the context's required physical properties are less stringent than those requested. A plan having less stringent required physical properties may or may not be suitable as an optimal plan. The comparison criterion GREATER indicates that the context's required physical properties are more stringent than those requested. A more constraining plan can be suitable for certain required physical properties. For example, if the request is for a plan having the required physical properties of "sorted by (a)" and a plan exists for the physical property "sorted by (a,b)", the latter plan will have satisfied the request. An UNDEFINED criterion indicates that the context's optimization goal has one or more physical properties that are less constraining and one or more physical properties that are more constraining. The INCOMPATIBLE criterion distinguishes a context as not being able to fulfill both the context's optimization goal and the requested optimization goal simultaneously.

If the result of the comparison is LESS, UNDEFINED, or GREATER (step 1306), then each plan associated with the context is searched further for an optimal plan that satisfies the required physical properties (step 1308). If the result of the comparison is EQUAL (step 1310), the two contexts (i.e, the "new" context being optimized and an existing context) are merged and the current plan associated with the context is used as an optimal plan to satisfy the request (step 1312). If the result of the comparison is INCOMPATIBLE (step 1314), the context is bypassed (step 1316). The first optimal plan that is found is used and when this occurs the search is terminated (step 1318-Y). Otherwise, the search proceeds to the next context associated with the group (step 1318-N).

Referring back to FIG. 6, if an optimal plan exists in the group for the current plan and for the requested required physical properties and cost, the task terminates (step 602-Y). Otherwise (step 602-N), the task proceeds to check if the group has any plans matching the requested required physical properties and cost that were generated from any of the previous passes (step 603). This is accomplished by scanning the contexts associated with the previous passes in the same manner as noted above in step 602 except that a plan's pass generated field 348 is ignored. For each existing plan having the same required physical properties (step 604), a Create_Plan task is placed onto the task stack with the expression, with a zero parameter indicating no previous calls to the Create_Plan task have been made for this expression, the context for the expression, a NULL previous context parameter, and the guidance (step 605). The process then proceeds to step 606.

When no optimal plan exists in the group having the requested required physical properties, an attempt is made to generate a new plan. This is generated by pushing onto the task stack the Optimize_Expression task 126 for each logical expression contained in the group with the associated context and guidance (steps 606–607). The Memo structure stores all the logical expressions associated with this group.

Figure 7:
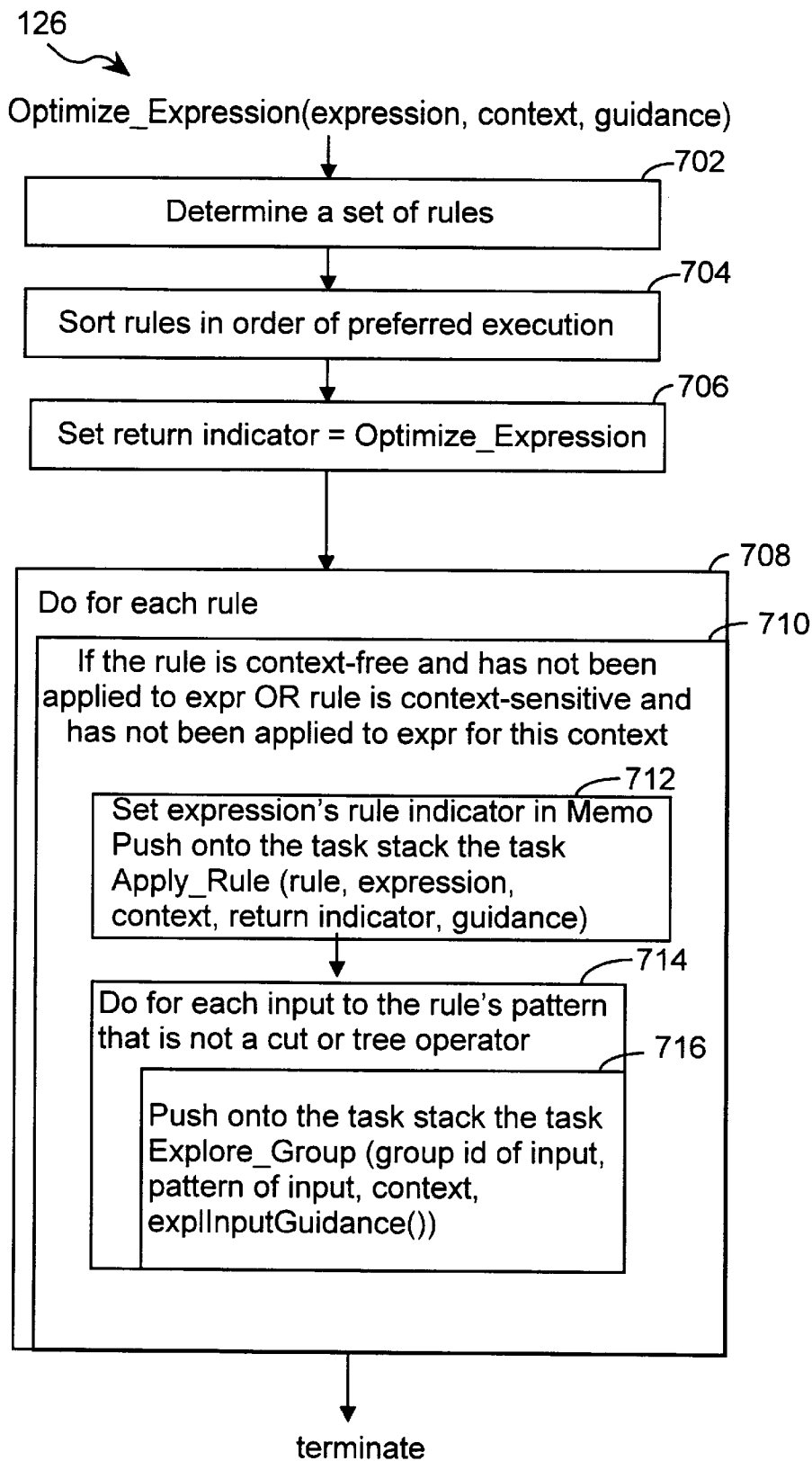
FIG. 7 is a flow chart of the Optimize_Expression task in a preferred embodiment of the present invention.

Referring to FIG. 7, the Optimize_Expression task 126 is used to select a set of rules for use in generating additional logical and physical expressions associated with the specified logical expression. Each rule is then applied in a certain order. For certain rules that have an explicit operator as an input other than a cut or tree operator, exploration transformations on the input are performed before a rule is applied. This ensures that all possible logical expressions are available before the rule is applied.

The rules that are selected for application for a particular logical expression are a function of the DBI (step 702). As noted above previously, the DBI contains search heuristics in the form of an enable method, match functions, promise functions, cutoff methods, and guidance methods. These search heuristics are utilized in determining which rules to use. The enable method determines whether a rule is applicable for a particular pass. The match methods identify those rules having an operator that matches a particular expression. The guidance structures specify information concerning the future search activity based on past search operations. The promise functions associate a value with each rule indicating how suitable the particular rule is for the particular expression. The cutoff methods limit the number of rules that are applied for a particular expression. The limit is considered the cutoff point.

The rules are selected and stored in a preferred order of execution which is based on the promise value associated with a rule (step 704). A return indicator is set to identify the Optimize_Expression task 126 (step 706) as the task which invoked the Apply_Rule task 134. This is to ensure that in the event a new logical expression is produced, additional transformations for the new expression are generated.

Next, the task processes each rule in accordance with the preferred order of execution (step 708). Since the stack is operated in a FIFO order, the last rule to be executed is pushed onto the stack first and the first rule to be executed is pushed onto the stack last. A rule is executed in certain situations. It is applied when the rule is a context-free rule that has not been previously applied to the expression or when the rule is a context-sensitive rule that has not been applied previously to the expression and for the particular required physical properties (step 710). These situations are determined by checking the logical expression in the search data structure. The applied context-free rule bit map 332 indicates which context-free rules have been applied previously to the expression and the applied context-sensitive rule list 334 indicates the context-sensitive rules that have been previously applied for the corresponding required physical properties.

If either of these situations are not applicable, the rule is bypassed. Otherwise, the appropriate rule indicators associated with the logical expression are set and the Apply_Rule task 134 is pushed onto the task stack for the rule (step 712). For each input to the rule's pattern that is not a cut operator or a tree operator (step 714), the Explore_Group task 128 is pushed onto to the stack with the group identifier of the input, the pattern of the input, the required physical properties, and a new guidance structure obtained from the method explIInputGuidance() (step 716). The Explore_Group task 128 will ensure that all possible exploration transformations for this pattern are produced before the rule is applied.

Figure 8:
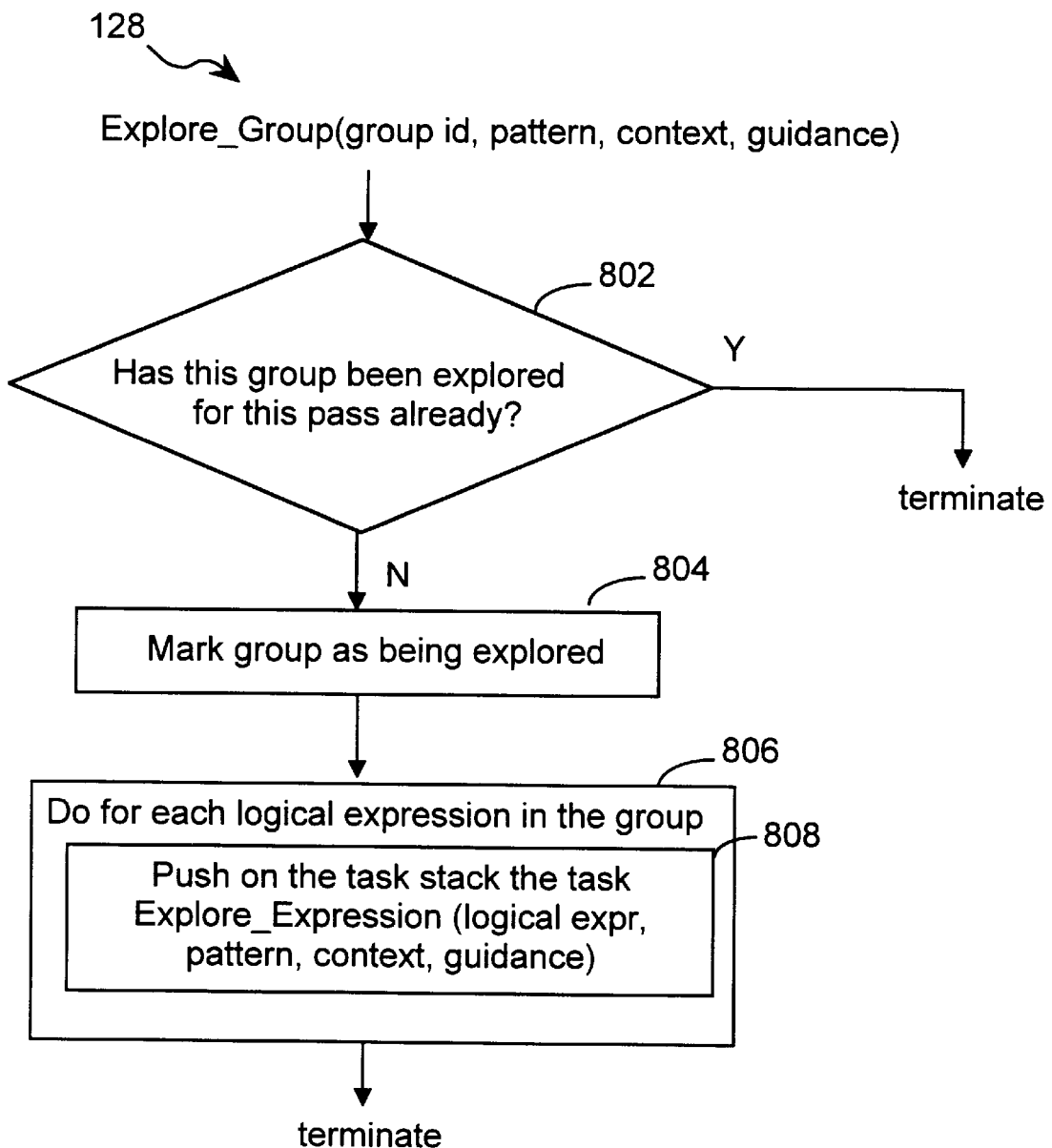
FIG. 8 is a flow chart of the Explore_Group task in a preferred embodiment of the present invention.

Referring to FIG. 8, the Explore_Group task 128 is used to determine if the group has been explored previously. When a group is explored, all possible context-free transformations rules are applied to each logical expression. As such, exploration needs to be applied only once for a group per pass. The exploration pass 307 associated with the group indicates if the group has been explored for a particular pass. Thus, the Explore_Group task 128 checks if a group has been explored previously for the pass (step 802). If so (step 802-Y), the task terminates. Otherwise (step 802-N), the exploration pass 307 associated with the group is marked as explored for the pass (step 804). The task pushes onto the task stack the Explore_Expression task 130 (step 808) for each logical expression in the specific group (step 806).

Figure 9:
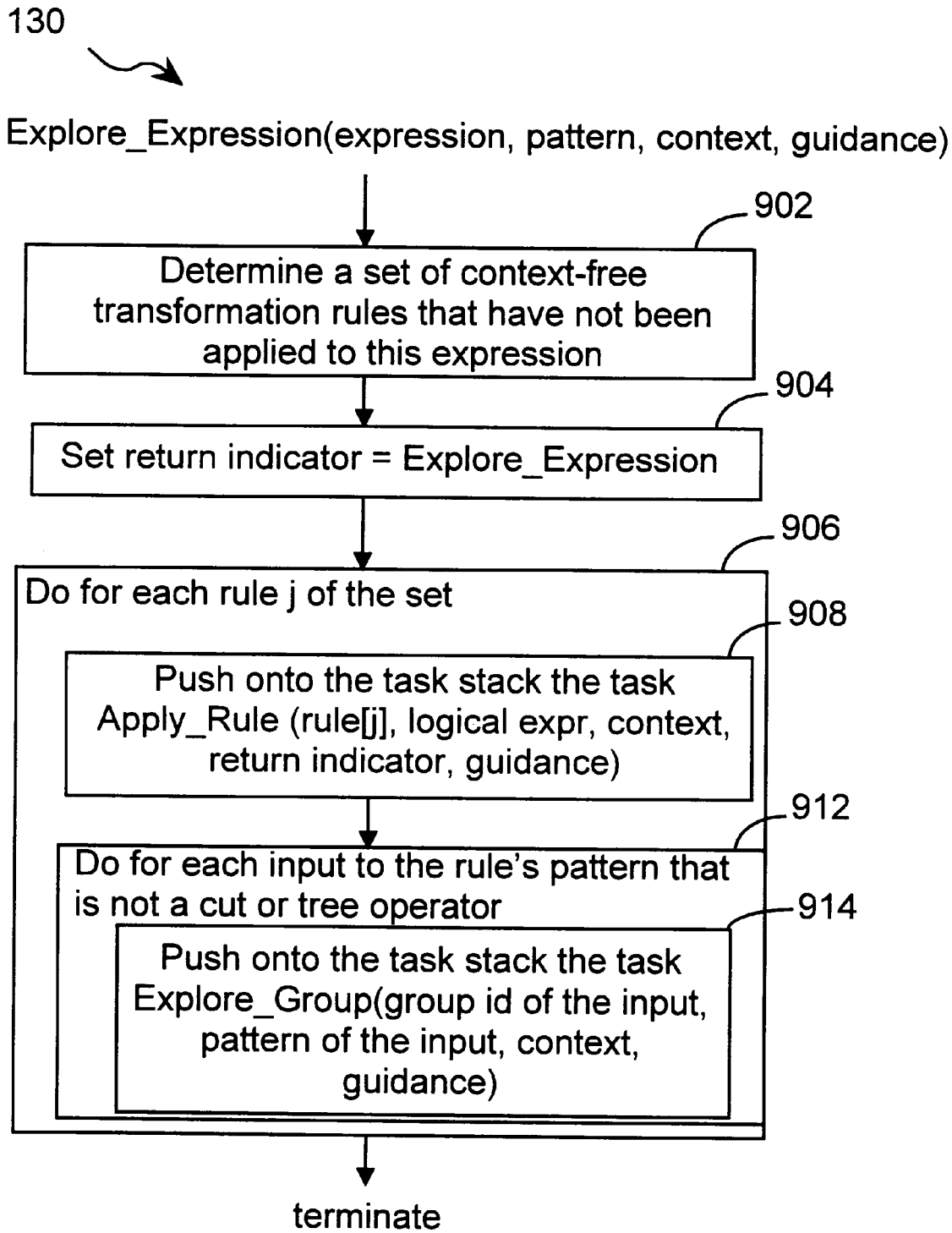
FIG. 9 is a flow chart of the Explore_Expression task in a preferred embodiment of the present invention.

Referring to FIG. 9, the Explore_Expression task 130 is used to explore a specific expression. First, a set of suitable context-free transformation rules that have not been applied previously to this particular expression are selected. The applied context-free rule bit map 332 is searched to determine this set of rules (step 902). The pattern that is passed to the task is used in the determination of the appropriate rules to select. A return indicator is set to Explore_Expression in order for the Apply_Rule task 134 to proceed with further processing once a new logical expression is generated (step 904).

Each rule is applied in a specified order (step 906) and a Apply_Rule task 134 is pushed onto the task stack for each rule along with the specified logical expression, the required physical properties, return indicator, and guidance (step 908). For each input to a rule that is not a tree or cut operator (step 912), the Explore_Group task 128 is pushed onto the task stack along with the group identifier for the input, the pattern of the input, the context, and the guidance (step 914).

The Apply_Rule task 134 is used to implement a rule thereby creating a new expression. The application of a rule matches an expression's operators in the same position as specified in the rule's pattern and produces an equivalent expression as specified in the rule's substitute. Prior to applying a rule to an expression, the Apply Rule task 134 finds all possible bindings that match the rule's pattern. The purpose of a binding is to find all possible logical expressions that can match a rule's pattern. Bindings are often encountered for rules that span more than one level and which have specific patterns for one or more input expressions. An input expression is denoted in the Memo structure 122 by its corresponding group identifier. This implies that any expression in the group can be used as the input expression. A binding serves to associate a particular expression for each input expression specified in a rule's pattern.

As the bindings are generated, each logical expression is checked if it is currently bound. This is done in order to prevent a circular binding which can set the search engine into a state of infinite recursion. Potential bindings that are already in use are skipped. The application of a rule can generate one or more substitutes. Typically, a rule's substitute is not known ahead of time. Depending on the type of rule that is applied, subsequent tasks are invoked to continue the search process of generating a plan. In the case where an implementation rule is applied, a new physical expression is created. In order for a plan to be generated from this physical expression, plans for each of its inputs need to be obtained. Thus, the Create_Plan task 132 is invoked. In the case where a new logical expression is generated as a result of exploring an expression, additional logical transformations are generated for the new expressions (invocation of the Explore_Expression task 130). In the case where a new logical expression is generated as a result of optimizing an expression, additional logical and physical transformations are applied to the new expression (invocation of the Optimize_Expression task 126).

Figure 10A:
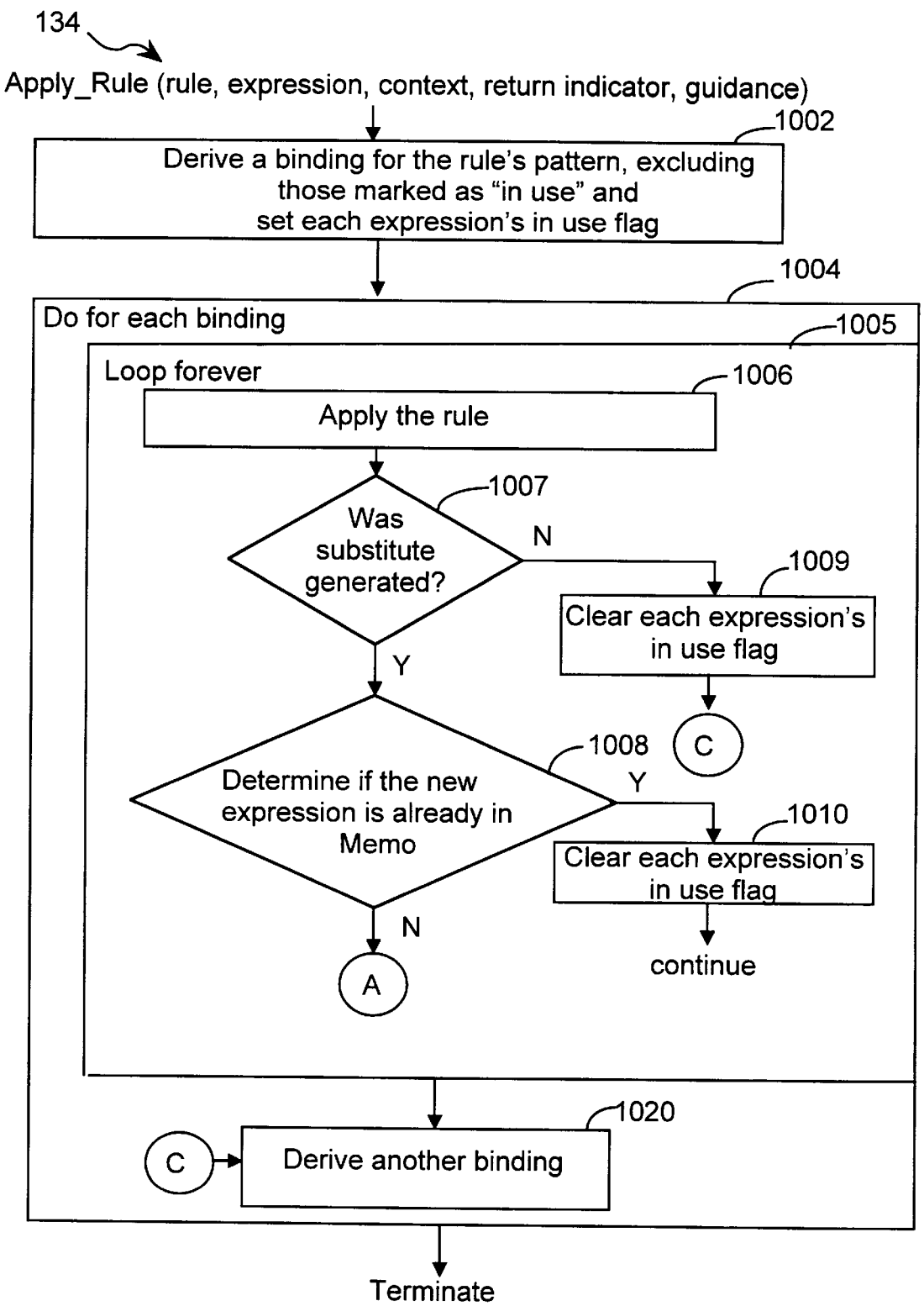
FIGS. 10–10B show a flow chart of the Apply_Rule task in a preferred embodiment of the present invention.
Figures 10, 10A, 10B:
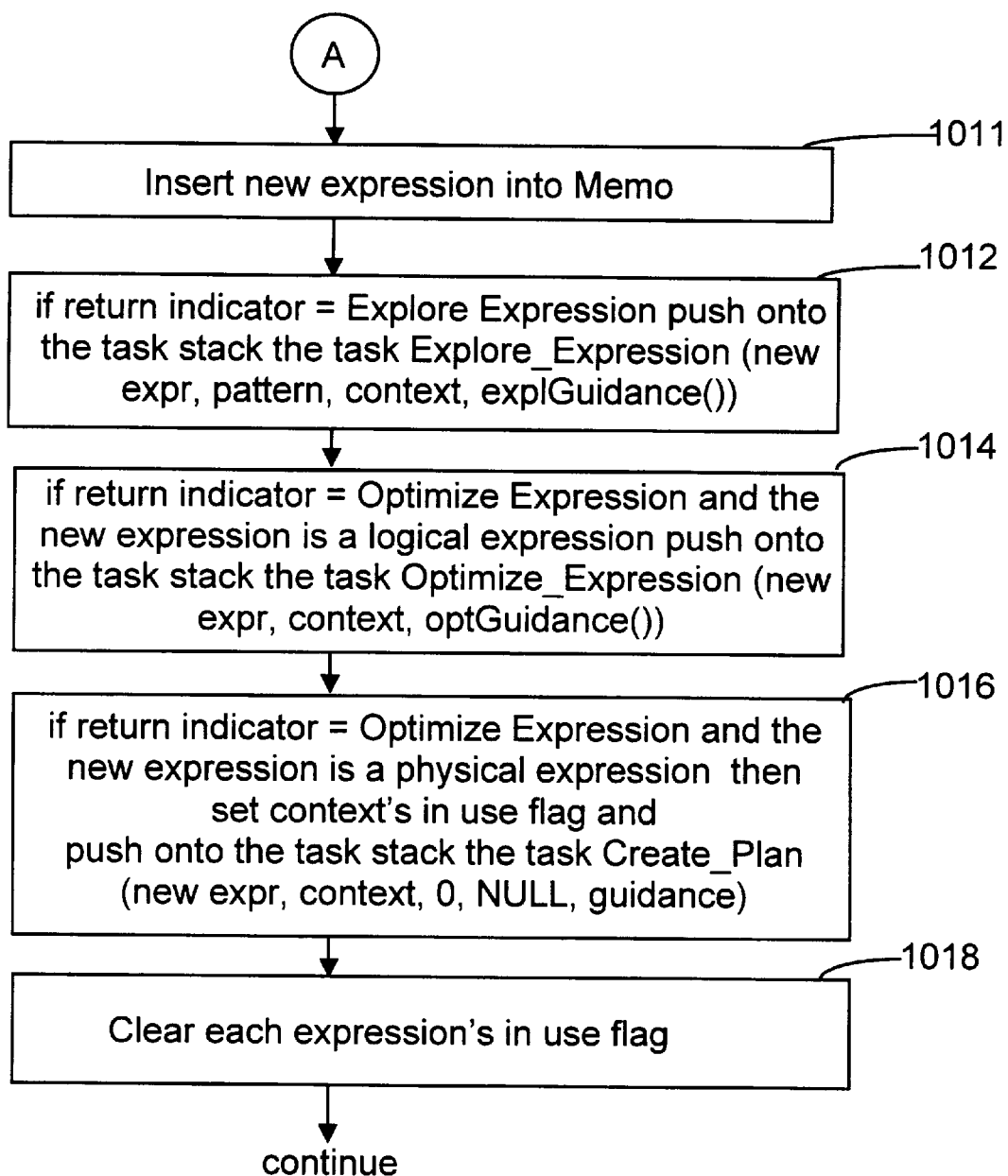

Referring to FIGS. 10A–10B, the Apply_Rule task 134 determines one possible binding for the specified rule's pattern and sets each bound expression's in use flag (step 1002). If an expression is already marked as "in use", that expression is not bound. Then, the task iterates for the binding (step 1004). Since a rule can produce one or more substitutes, the task loops while a substitute is generated (step 1005). The rule is applied (step 1006) and if no substitute is generated (step 1007-N), each bounded expression's in use flag is cleared (step 1009) and another binding is generated, if any (step 1020). Otherwise, if a substitute was generated (step 1007-Y), a new expression is created in accordance with the rule's substitute. If the new expression is already in the Memo structure 122 (step 1008-Y), each bounded expression's in use flag is cleared and the task continues (step 1010).

Otherwise (step 1008-N), it is inserted as follows (step 1011). Each expression in the Memo structure 122 is assigned a hash value that is based on its contents and the groups of its inputs. The hash values are stored in a hash table. When a new expression is generated, a hash value is determined for the expression. If it exists in the hash table then the two expressions are compared further to determine if the new expression is a duplicate. If the new expression is a duplicate, it is not inserted in the Memo structure 122. If the hash value does not reside in the hash table, the new expression is inserted in the Memo structure 122 and the corresponding hash value is inserted in the hash table. When an implementation rule is applied, a new physical expression is inserted and when a transformation rule is applied, a new logical expression is inserted. Although this is the preferred implementation for detecting duplicate expressions in the Memo structure, the present invention is not constrained to this scheme and others can be utilized.

Next, the Apply_Rule task 134 places onto the task stack 136 the next task to continue the processing associated with the substitute. The return indicator dictates the appropriate task. If the return indicator indicates that the Apply_Rule task 134 was invoked from an Explore_Expression task 130, the task 134 proceeds to push onto the task stack 136 the Explore_Expression task 130 for the newly generated expression with the appropriate parameters (step 1012). If the return indicator is set to Optimize_Expression and the newly created expression is a logical expression, the task 134 pushes onto the task stack 136 the task Optimize_Expression with the appropriate parameters (step 1014). If the return indicator indicates Optimize_Expression and the newly generated expression is a physical expression, the Apply_Rule task 134 pushes onto the task stack 136 the task Create_Plan 132 with the appropriate parameters (step 1016). Next, each expression's in use flag is cleared (step 1018). Another binding is then generated as described above (step 1020) and the process is repeated for the newly bounded expression. When each possible binding has been processed, the task terminates.

Figure 11:
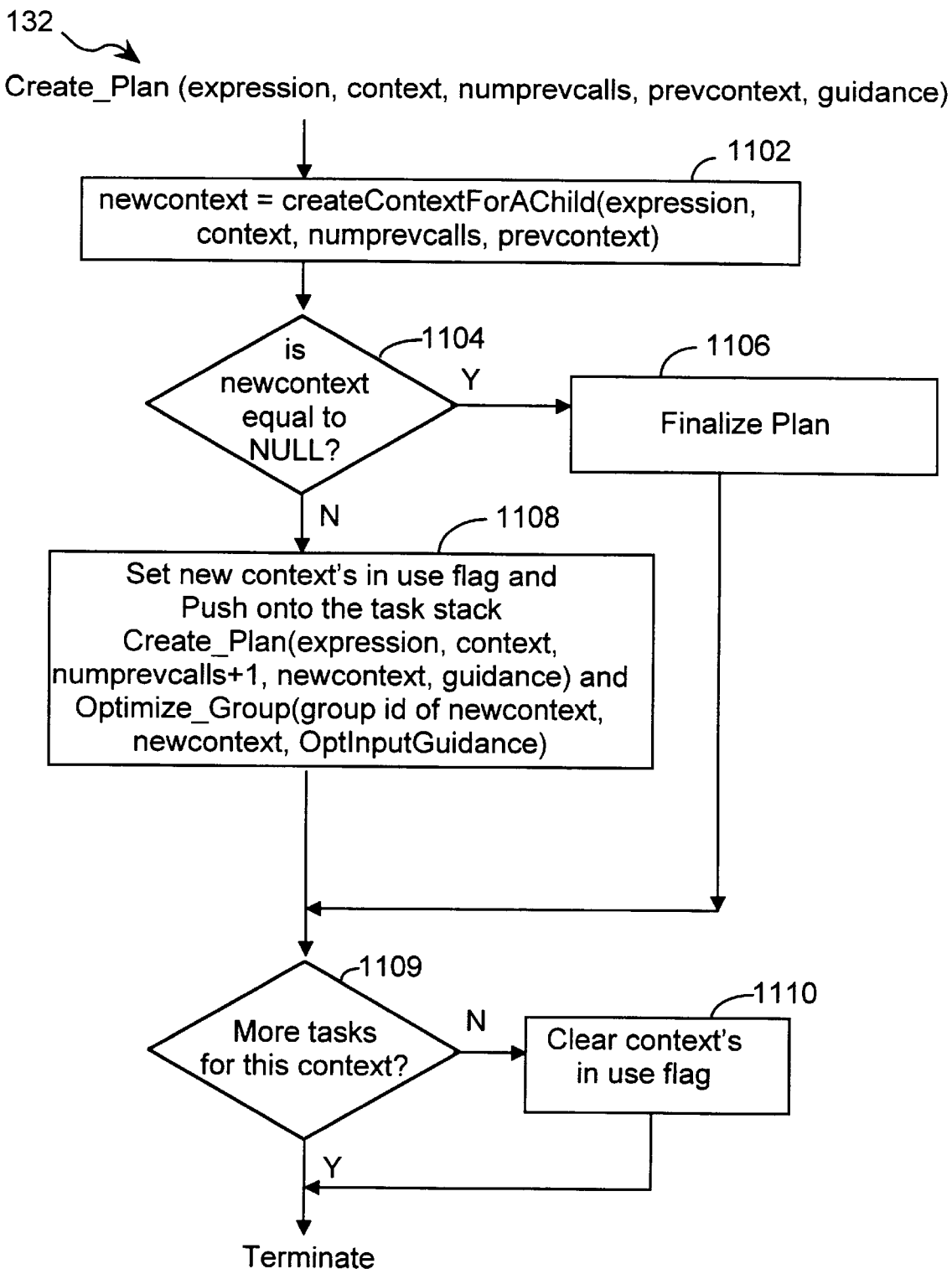
FIG. 11 is a flow chart of the Optimize_Inputs task in a preferred embodiment of the present invention.

FIG. 11 describes the steps used in the Create_Plan task 132. The goal of the Create_Plan task 132 is to find a plan (or solution) for the expression that is passed to the task. This consists of finding a plan for each input to the expression. A plan for the expression will be generated if the cost for the plan does not exceed a prescribed upper bound (which is the cost limit contained in the context for the associated expression).

The expression for which a plan is being obtained is associated with a set of required physical properties. There can be many combinations of these required physical properties for the inputs of the expression. Each combination is considered a separate subproblem for each input. However, each combination need not be considered by the search engine. The Create_Plan task utilizes the createContextForAChild method of the DBI to determine the combinations that the search engine should consider.

FIGS. 14A–14C illustrate an example of the Create_Plan task. The task is initially invoked with the expression Mergejoin($cut_1$, $cut_2$) where $cut_1$ is bound to group 0 and $cut_2$ is bound to group 1. Group 0 includes the logical expression scan $t_1$ and group 1 includes the logical expression scan $t_2$. The Mergejoin expression is associated with the join predicate $t_1.a=t_2.b$ and $t_1.c=t_2.d$ which specifies that table $t_1$, column a is sorted in the same manner as table $t_2$, column b and that table $t_1$, column c is sorted in the same manner as table $t_2$, column d. There are four different combinations of required physical properties that can satisfy this constraint and they are illustrated in FIG. 14B as rpp1 through rpp4. In the prior art Tandem optimizer, the search engine searched for a plan for each input with each combination (e.g., a plan for input 1 having the required physical properties rpp1, a plan for input 2 having the required physical properties rpp1, a plan for input 1 having the required physical properties rpp2, a plan for input 2 having the required physical properties rpp2, etc.).

By contrast, the Create_Plan task allows the createContextForAChild method to determine the number and combinations of required physical properties that will be considered for each input's plan as well as the sequence that each input is to be considered. The createContextForAChild method utilizes heuristics based on the data model in order to select those combinations that will generate cost effective plans for the inputs. For example, as shown in FIG. 14C, the first time that the Create_Plan task is invoked (i.e, numprevcalls=0) a new context is created for the first input having the required physical properties sort(a,c) in ascending order. The new context is then used to find a plan for the first input by placing an Optimize_Group task on the task stack for the first input with the new context. The createContextForAChild method determines the appropriate required physical properties for the first input. The Create_Plan task also places another Create_Plan task on the task stack for the parent expression in order to obtain a plan for the second input.

The second time that the Create_Plan task is invoked for the same expression (i.e, numprevcalls=1) a new context is created for the second input having the required physical properties sort (b,d) in ascending order. The createContextForAChild task determines based on the parameters passed to it the required physical properties that the context for the second input should have. The new context is then used to obtain a plan for the second input. This process proceeds with additional invocations of the Create_Plan task generating additional plans for the inputs with different combinations of required physical properties for each input. The createContextForAChild method determines when the appropriate number of combinations have been considered and returns a NULL value to indicate completion of the input plan generation. The parent expression's plan is then finalized utilizing plans for the inputs having the lowest cost.

Referring to FIG. 11, the Create_Plan task calls the createContextForAChild method with the expression, the expression's context, the number of previous calls (numprevcalls) to the task with this expression, and a previous context (step 1102). The expression's context contains the required physical properties for the expression. The createContextForAChild method returns a new context including the appropriate required physical properties for one of the inputs or a NULL value. The NULL value indicates that the expression is ready to be finalized. This can be due to the fact that all appropriate combinations of required physical properties for the inputs have been exhausted or that the expression has no inputs.

If the new context is not NULL (step 1104-N), the task sets the new context's in use flag and places onto the task stack a Create_Plan task and a Optimize_Group task with the appropriate parameters (step 1108).

If the new context is NULL (step 1104-Y), a plan is finalized for the expression. The cost for the expression is set as a function of its operator and required physical properties. The costing function associated with the DBI is used to approximate a cost that reflects the CPU cost, I/O cost, communication and resource consumption of the expression. If the expression does not have inputs, the cost for the expression is checked against the cost in its context. If the cost exceeds the context's cost limit, a plan is not generated for the expression and the task terminates. If the cost does not exceed the context's cost limit, a plan 305 is created for the expression. The plan includes the expression 338, its cost 344, the context 342, required physical properties 346, and an indicator 348 that specifies the pass in which it was generated. The context 308 for the expression is updated to include this plan. The context's current plan pointer 320 is updated to point to the plan, if this plan has the lowest cost.

If the expression has inputs, a plan 305 is created if the input plans do not exceed the expression's cost limit. The task chooses a plan for each input from the previously generated plans that were returned in the precontext parameter and determines whether inclusion of the plan will exceed the expression's cost limit. The expression will utilize an input's plan if it does not exceed the expression's cost. The expression's cost will be updated to reflect the cost of its inputs. If the expression's cost is excessive, a plan is not generated for the expression and the task terminates. Otherwise, a plan 305 is generated which includes the expression 338, pointers to the contexts of each input 340, the expression's context 342, its cost 344, the required physical properties 346, and an indicator 348 that specifies the pass in which it was generated. The context 308 for the expression is updated to include this plan. The context's current plan pointer 320 is updated to point to the plan, if the newly generated plan is the lowest cost plan.

Further, the Create_Plan task determines if the context is associated with any other tasks (step 1109). A counter can be associated with the context that indicates the number of tasks still yet to be processed for the context. This counter can be incremented each time a Optimize_Expression, Apply_Rule or Create_Plan is pushed onto the task stack for the context and decremented each time one of these tasks terminates. A check is made to determine if any more tasks for this context are outstanding (step 1109). When the counter is zero, then the context's in use flag is cleared (step 1110). Lastly, the task terminates.

ALTERNATE EMBODIMENTS

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

The present invention is not limited to a distributed computer system. It may be practiced without the specific details and may be implemented in various configurations, or makes or models of tightly-coupled processors or in various configurations of loosely-coupled microprocessor systems.

A principal aspect of the query optimizer presented herein is that it is extensible to suit almost any type of data model. Thus, the present invention can be applied to optimize queries on object-relational database management systems, object databases, and even data contained in spreadsheets. In essence, the query optimizer presents one interface for dealing with heterogenous data as well as data models.

Additionally, the query optimizer can be applied to optimize problems other than database queries or SQL queries. Furthermore, the rules need not be fixed at compile time. Rules could be added and removed dynamically as a result of executing tasks especially between optimization passes.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

What is claimed is:

1. A method for generating a plan for executing a database query, comprising:
   (a) providing said database query with an optimization goal;
   (b) representing said database query as a query tree including one or more levels of logical expressions, each logical expression including zero or more logical expressions as inputs, a subset of said inputs representing one or more subtrees, each subtree having a top logical expression and one or more logical expressions as inputs, each level other than a top level having one or more logical expressions that are input to a higher level logical expression at a preceding level, one of said logical expressions representing a root expression;
   (c) storing in a memory a search data structure for storing a plurality of groups, each group including at least one logical expression from said query tree, zero or more equivalent expressions associated therewith, one or more plans, and one or more contexts, each of said plans implementing at least one expression associated with said group and having an optimization goal, each of said contexts having an associated optimization goal and representing ones of said plans that are compatible with said context's associated optimization goal;
   (d) obtaining a plurality of rules for use in generating one or more equivalent expressions or one or more plans, a first subset of said rules including context-free rules for application once to a particular logical expression, a second subset of said rules including context-sensitive rules for application once to a particular logical expression for a particular optimization goal;
   (e) partitioning said query tree into one or more levels of subproblems, each subproblem including one or more of said logical expressions, a first level having one of said subproblems representing said root expression, each subproblem at each subsequent level representing one of said inputs to a corresponding logical expression at a preceding level, each subproblem associated with one of said groups and including a specified optimization goal;
   (f) optimizing each of said subproblems so that at least one plan is obtained for each of said subproblems, said optimizing step further comprising the steps of:
      (1) searching each of said contexts of a specified subproblem's group for at least one plan having an optimization goal that is suitable for said specified subproblem's optimization goal;
      (2) when no plan is found, determining a set of rules for use in generating zero or more plans that satisfy said specified subproblem's optimization goal, said set including zero or more context-free rules and zero or more context-sensitive rules;
      (3) applying each of said context-free rules in the determined set to one or more specified logical expressions in said specified subproblem if not applied previously and applying each of said context-sensitive rules in said determined set to one or more specified logical expressions for a particular optimization goal if not applied previously; and (4) storing zero or more equivalent expressions or plans generated from said application in said specified subproblem's group in said search data structure; and (g) generating a plan for said database query from said plans associated with each of said subproblems.

2. The method of claim 1, each logical expression in said search data structure further including data indicating which of said context-free rules have been applied to said logical expression and which of said context-sensitive rules have been applied to said logical expression for an associated optimization goal.

3. The method of claim 1, said step (f)(1) further comprising the step of bypassing ones of said contexts whose associated optimization goal is incompatible with said subproblem's optimization goal.

4. The method of claim 1 further comprising the steps of:

repeating steps (e) through (f) for a number of passes to generate one or more additional plans representing said database query; and selecting a best one of said plans representing said database query in accordance with a prescribed criteria.

5. The method of claim 1, wherein each said optimization goal includes one or more required physical properties.

6. The method of claim 1, said step (e) further comprising the steps of
  for each of said subproblems having at least one input, generating a set of subproblems for each input, each generated input subproblem having a different optimization goal that satisfies an associated parent subproblem's optimization goal, said set including less than all possible input subproblems that could be generated for the corresponding input.

7. The method of claim 1, said database query including one or more levels of join expressions, each join expression including one or more input expressions at a subsequent level, each input expression including zero or more join expressions and one or more table expressions, each of said table expressions having an associated table size;

said step (b) further including restructuring each of said join expressions such that each table expression at each level has an associated table size that is larger than or equal to the table size associated with a table expression at an immediately succeeding level.

8. A database query optimization system, comprising:

a memory for storing
  a query tree representing a database query, said query tree including one or more levels of logical expressions, each logical expression including zero or more logical expressions as inputs, a subset of said inputs representing one or more subtrees, each level other than a top level having one or more logical expressions that are input to a higher level logical expression at a preceding level, one of said logical expressions representing a root expression,
  a search data structure including a plurality of groups, each group including at least one logical expression from said query tree, zero or more equivalent expressions associated therewith, one or more plans, and one or more contexts, each of said plans implementing at least one expression associated with said group and having an optimization goal and a cost, each of said contexts having an associated optimization goal and representing ones of said plans that are compatible with said context's associated optimization goal, and
  a plurality of rules for use in generating one or more equivalent expressions or one or more plans, a first subset of said rules including context-free rules for application once to a particular logical expression, a second subset of said rules including context-sensitive rules for application once to a particular logical expression and for a particular optimization goal;

a search engine for generating one or more plans that execute said database query, said search engine including instructions that
  partition said database query into one or more subproblems, each subproblem including one or more of said logical expressions and an optimization goal, a first level having one of said subproblems representing said root expression, each subproblem at each subsequent level representing one of said inputs to a corresponding top logical expression at a preceding level, each of said subproblems associated with one of said groups corresponding to said top logical expression in said subproblem,
  obtain a plan for each of said subproblems, said plan generated by first searching each of said contexts associated with a particular subproblem's group for at least one plan having an optimization goal that is suitable for said subproblem's optimization goal, and when no suitable plan is found, determine a set of rules for use in generating zero or more plans that satisfy said specified subproblem's optimization goal, said set including zero or more context-free rules and zero or more context-sensitive rules, apply one or more rules in the determined set to each logical expression in said particular subproblem, each of said context-free rules in the determined set applied to a particular logical expression if not applied previously, each of said context-sensitive rules in the determined set applied to a particular logical expression for a particular optimization goal if not applied previously, and
  generate a plan for said database query as a combination of each of said subproblem's plans.

9. The system of claim 8 further comprising:

a plurality of tasks, each task including a subset of said search engine's instructions;

a task scheduler that manages scheduling one or more tasks on one or more processors associated with said system; and a task data structure for storing one or more tasks awaiting execution.

10. The system of claim 8, said search engine further including instructions to bypass a context whose associated optimization goal is incompatible with said particular subproblem's optimization goal when searching for a suitable plan for a particular subproblem.

11. The system of claim 8, each of said plans in said search data structure further including references to zero or more levels of input plans, each input plan having zero or more inputs plans, each input plan associated with a different group than an associated parent plan and including a cost; and said search engine further including instructions to repeatedly execute said search engine's instructions for a number of passes, each pass generating zero or more additional plans for said database query, each pass utilizing a different set of rules to generate said additional plans, locate one or more plans generated in a previous pass that match a specified subproblem's optimization goal, generate at least one replacement input plan for one of said input plans associated with at least one of said matching plans, said replacement input plan having a lower cost than said input plan.

12. The system of claim 8, a database implementor that utilizes heuristics in determining each subproblem's optimization goal.

13. The system of claim 8, each said optimization goal including one or more required physical properties.

14. A computer program product for use in conjunction with a computer system, the computer program product comprising a computer readable storage medium and a computer program mechanism embedded therein, the computer program mechanism comprising:

instructions for generating a query tree representing a database query, said query tree including one or more levels of logical expressions, each logical expression including zero or more logical expressions as inputs, a subset of said inputs representing one or more subtrees, each level other than a top level having one or more logical expressions that are input to a higher level logical expression at a preceding level, one of said logical expressions representing a root expression;

instructions for generating a search data structure including a plurality of groups, each group including at least one logical expression from said query tree, zero or more equivalent expressions associated therewith, one or more plans, and one or more contexts, each of said plans implementing at least one expression associated with said group and having an optimization goal and a cost, each of said contexts having an associated optimization goal and representing ones of said plans that are compatible with said context's associated optimization goal;

instructions for implementing a plurality of rules for use in generating one or more equivalent expressions or one or more plans, a first subset of said rules including context-free rules for application once to a particular logical expression, a second subset of said rules including context-sensitive rules for application once to a particular logical expression and for a particular optimization goal;

a search engine for generating one or more plans that execute said database query, said search engine including instructions that partition said database query into one or more subproblems, each subproblem including one or more of said logical expressions and an optimization goal, a first level having one of said subproblems representing said root expression, each subproblem at each subsequent level representing one of said inputs to a corresponding top logical expression at a preceding level, each of said subproblems associated with one of said groups corresponding to said top logical expression in said subproblem, obtain a plan for each of said subproblems, said plan generated by first searching each of said contexts associated with a particular subproblem's group for at least one plan having an optimization goal that is suitable for said subproblem's optimization goal, and when no suitable plan is found, determine a set of rules for use in generating zero or more plans that satisfy said specified subproblem's optimization goal, said set including zero or more context-free rules and zero or more context-sensitive rules, apply one or more rules in said determined set to each logical expression in said particular subproblem, each of said context-free rules in said determined set applied to a particular logical expression if not applied previously, each of said context-sensitive rules in said determined set applied to a particular logical expression for a particular optimization goal if not applied previously, and generate a plan for said database query as a combination of each of said subproblem's plans.

15. The computer program product of claim 14 further comprising:

a plurality of tasks, each task including a subset of said search engine's instructions;

a task scheduler that manages scheduling one or more tasks on one or more processors associated with said system; and a task data structure for storing one or more tasks awaiting execution.

16. The computer program product of claim 14, said search engine further including instructions to bypass a context whose associated optimization goal is incompatible with said particular subproblem's optimization goal when searching for a suitable plan for a particular subproblem.

17. The computer program product of claim 14, each of said plans in said search data structure further including references to zero or more levels of input plans, each input plan having zero or more inputs plans, each input plan associated with a different group than an associated parent plan and including a cost; and said search engine further including instructions to repeatedly execute said search engine's instructions for a number of passes, each pass generating zero or more additional plans for said database query, each pass utilizing a different set of rules to generate said additional plans, locate one or more plans generated in a previous pass that match a specified subproblem's optimization goal, generate at least one replacement input plan for one of said input plans associated with at least one of said matching plans, said replacement input plan having a lower cost than said input plan.

18. The computer program product of claim 14, a database implementor that utilizes heuristics in determining each subproblem's optimization goal.

19. The computer program product of claim 14, each said optimization goal including one or more required physical properties.

* * * * *